US012755501B2

(12) United States Patent
Shimizu

(10) Patent No.: US 12,755,501 B2
(45) Date of Patent: Oct. 6, 2026

(54) INFORMATION PROCESSING APPARATUS, INFORMATION PROCESSING METHOD, AND INFORMATION PROCESSING SYSTEM

(71) Applicant: Sony Group Corporation, Tokyo (JP)

(72) Inventor: Takayoshi Shimizu, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 236 days.

(21) Appl. No.: 18/014,959

(22) PCT Filed: May 26, 2021

(86) PCT No.: PCT/JP2021/019897
§ 371 (c)(1),
(2) Date: Jan. 6, 2023

(87) PCT Pub. No.: WO2022/014170
PCT Pub. Date: Jan. 20, 2022

(65) Prior Publication Data

US 2023/0260235 A1 Aug. 17, 2023

(30) Foreign Application Priority Data

Jul. 13, 2020 (JP) ................................ 2020-119777

(51) Int. Cl.
*G06T 19/20* (2011.01)
*G06V 10/24* (2022.01)

(52) U.S. Cl.
CPC .............. *G06T 19/20* (2013.01); *G06V 10/24* (2022.01); *G06T 2219/2004* (2013.01)

(58) Field of Classification Search
CPC .................. G06T 19/006; G06T 19/20; G06T 2219/2004; G06T 2200/24; G06T 19/003; G06T 13/40; G06T 3/14; G06T 19/00; G06T 7/70; G06T 7/73; G06T 11/60; G06T 17/00; G06V 10/24; G06V 20/58; G06V 10/44; G06V 40/20; G06V 10/25; G06V 10/764; G06V 40/28; G06F 3/011; G06F 3/04815; G06F 3/017; G06F 3/0346;
(Continued)

(56) References Cited

U.S. PATENT DOCUMENTS 11,204,678 B1 * 12/2021 Baker ................ G06F 3/04842
11,250,617 B1 * 2/2022 Sempe ................. H04L 65/611
(Continued)

FOREIGN PATENT DOCUMENTS

CN 107045711 A 8/2017
CN 111052042 A 4/2020
(Continued)

*Primary Examiner* — Xilin Guo
(74) *Attorney, Agent, or Firm* — Paratus Law Group, PLLC

(57) ABSTRACT

Provided are an information processing apparatus, an information processing method, and an information processing system capable of further enhancing the entertainment value of image capturing experience in a virtual space. The information processing apparatus includes a control unit that, when an imaging trigger for imaging a subject in a virtual space is detected, generates a captured image obtained by imaging the subject, and performs control to arrange the generated captured image in the virtual space as a virtual object.

24 Claims, 18 Drawing Sheets

(58) Field of Classification Search
CPC ....... A63F 13/45; A63F 13/52; H04N 13/117; H04N 13/111
See application file for complete search history.

(56) References Cited

U.S. PATENT DOCUMENTS

| | | | | |
|---|---|---|---|---|
| 2009/0303246 A1* | 12/2009 | Tsuda | G06F 3/04815 | 345/592 |
| 2010/0002070 A1* | 1/2010 | Ahiska | H04N 7/181 | 348/E7.001 |
| 2014/0092220 A1* | 4/2014 | Kawamura | H04N 25/702 | 348/49 |
| 2018/0288391 A1* | 10/2018 | Lee | G06F 3/011 | |
| 2019/0026950 A1* | 1/2019 | Sawaki | G06T 19/006 | |
| 2019/0306419 A1* | 10/2019 | Kajiwara | H04N 23/50 | |
| 2020/0364881 A1* | 11/2020 | Drobitko | G06T 7/246 | |
| 2020/0410761 A1* | 12/2020 | Cragg | G06F 3/011 | |

FOREIGN PATENT DOCUMENTS

| | | | |
|---|---|---|---|
| JP | 2004-070821 | A | 3/2004 |
| JP | 2005-045601 | A | 2/2005 |
| JP | 2008-059152 | A | 3/2008 |
| JP | 2009-176025 | A | 8/2009 |
| JP | 2017-138912 | A | 8/2017 |
| JP | 2017-228901 | A | 12/2017 |
| JP | 2019-021122 | A | 2/2019 |
| JP | 2019-021236 | A | 2/2019 |
| JP | 2019-139673 | A | 8/2019 |
| WO | WO 2019/067902 | A1 | 4/2019 |

* cited by examiner

INFORMATION PROCESSING APPARATUS, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2021/019897 (filed on May 26, 2021) under 35 U.S.C. § 371, which claims priority to Japanese Patent Application No. 2020-119777 (filed on Jul. 13, 2020), which are all hereby incorporated by reference in their entirety.

TECHNICAL FIELD

The present disclosure relates to an information processing apparatus, an information processing method, and an information processing system.

BACKGROUND ART

In a virtual reality (VR) application that has become widespread in recent years, a user can view a virtual space in which 3D models are arranged from an arbitrary viewpoint. Such a VR world can be provided mainly by using a non-transmissive head mounted display (HMD) that covers a user's field of view with a display unit. One of the events for more enjoying the experience in the virtual space is capturing photographs in the virtual space (storage of an image displayed as the virtual space). In a current game or moving image distribution content, there is a screenshot function of acquiring a still image of a video drawn on an entire display device.

Furthermore, the following documents can be cited as examples of techniques for providing the virtual space.

Patent Document 1 below discloses a technique in which, when a user operates a camera object (virtual object) arranged in a virtual space to capture (a panoramic image developed in) the virtual space, a photographic image generated by the image capturing is displayed on a monitor object. Then, the photographic object is arranged in the virtual space according to a slide operation to the monitor object by the user.

Furthermore, Patent Document 2 below discloses a technique for outputting, from a printer in the real world, a photographic image captured by an operation of an avatar (a character object serving as a virtual self of a user) in a virtual space.

CITATION LIST

Patent Document

Patent Document 1: Japanese Patent Application Laid-Open No. 2019-021122

Patent Document 2: Japanese Patent Application Laid-Open No. 2009-176025

SUMMARY OF THE INVENTION

Problems to be Solved by the Invention

However, in a case where a photographic image captured in the virtual space is arranged in the virtual space, two operations such as an image capturing operation and a sliding operation are required in Patent Document 1 described above, and the operation is complicated.

Therefore, the present disclosure proposes an information processing apparatus, an information processing method, and an information processing system capable of further enhancing the entertainment value of the image capturing experience in a virtual space.

Solutions to Problems

According to the present disclosure, there is proposed an information processing apparatus including a control unit that, when an imaging trigger for imaging a subject in a virtual space is detected, generates a captured image obtained by imaging the subject, and performs control to arrange the generated captured image in the virtual space as a virtual object.

According to the present disclosure, there is proposed an information processing method including, when a processor detects an imaging trigger for imaging a subject in a virtual space, generating, by a processor, a captured image obtained by imaging the subject, and performing control to arrange the generated captured image in the virtual space as a virtual object.

According to the present disclosure, there is proposed an information processing system including: a display device; a controller; and an information processing apparatus including a control unit that, when an imaging trigger for imaging a subject in a virtual space displayed on the display device is detected by the controller, generates a captured image obtained by imaging the subject, and performs control to arrange the generated captured image in the virtual space as a virtual object.

MODE FOR CARRYING OUT THE INVENTION

Hereinafter, preferred embodiments of the present disclosure will be described in detail with reference to the accompanying drawings. Note that, in the present specification and the drawings, components having substantially the same functional configuration are denoted by the same signs, and redundant description is omitted.

Furthermore, the description will be given in the following order.

1. Outline of information processing system according to one embodiment of the present disclosure
2. Configuration example
3. Operation processing
3-1. Imaging processing
3-2. Arrangement processing of captured image
3-3. Tag processing of captured image
3-4. Filtering processing at the time of imaging
3-5. Rearrangement processing of captured image
3-6. Sharing processing of captured image
4. Others
5. Summary

Figure 1:
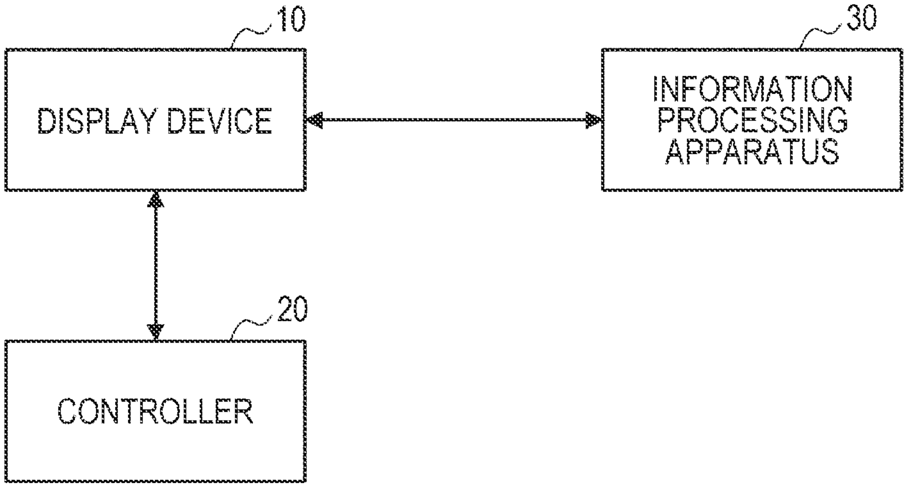
FIG. 1 is a diagram illustrating a configuration example of an information processing system according to an embodiment of the present disclosure.

1. Overview of Information Processing System According to One Embodiment of Present Disclosure An outline of an information processing system according to an embodiment of the present disclosure will be described with reference to FIGS. 1 to 3. FIG. 1 is a diagram illustrating a configuration example of an information processing system according to an embodiment of the present disclosure. As illustrated in FIG. 1, the information processing system according to the present embodiment includes a display device 10, a controller 20, and an information processing apparatus 30.

In the present embodiment, a higher entertaining image capturing experience in a virtual space (virtual reality (VR)) is provided. The virtual space is presented using, for example, a non-transmissive head mounted display (HMD) that covers the user's field of view. In the present embodiment, as an example, a case where the display device 10 is realized by an HMD is assumed.

The HMD that implements the display device 10 may be mounted on the head of the user, may include an image display unit for each of the left and right eyes, and may be configured to be able to control vision and hearing of the user by using headphones in combination. With the configuration of blocking the outside world, it is possible to increase a virtual reality feeling (a feeling of immersion in the virtual space) at the time of viewing. Furthermore, the HMD can also display different videos in the left and right eyes, and can present a 3D image by displaying an image having parallax with respect to the left and right eyes.

Furthermore, in the virtual space, a virtual object that is a generated three-dimensional image (so-called 3D model), a stereoscopic image generated on the basis of information obtained by imaging the real space, and the like are arranged (displayed). The imaging of the real space may be performed by an omnidirectional camera. Furthermore, imaging of the real space may be performed by a plurality of cameras.

Such a virtual space video (In this specification, the content is also referred to as VR content.) may be omnidirectional content or free viewpoint content. Note that the free viewpoint content generates a video when the virtual camera is placed at an arbitrary position, and enables viewing of the video from all viewpoints. Furthermore, as used herein, the term "virtual space" (or "VR") refers to a representation of a real or imaginary environment with rules of interaction simulated by one or more processors that an actual user may sense via one or more display devices and/or interact with via one or more user interfaces. The term "user interface" refers to an actual device from which a user is able to send inputs to or receive outputs from the virtual world.

In the virtual space, the user may be represented by an avatar, or the world of the virtual space may be displayed from the viewpoint of the avatar without displaying the avatar on the display. In the present specification, the viewpoint (In this specification, it is also referred to as a "user's viewpoint in the virtual space".) of the user (or the avatar) in the virtual space can be regarded as the field of view of the virtual camera. A "virtual camera" refers to a point of view in a virtual space and is used in calculations to draw a three-dimensional virtual space as a two-dimensional image on a display (display device).

Furthermore, the VR content according to the present embodiment may be, for example, live distribution (distribution in real time) of a music concert, a stage, various events, a lecture, a class, a program, and the like, may be one in which past distribution is recorded, or may be one recorded and generated for distribution. Furthermore, the VR content may be a game, a movie, a drama, an animation, and the like. The content of the VR content is not particularly limited.

Furthermore, the information processing system according to the present embodiment includes the controller 20 for conveying the intention of the user to the system. There may be a plurality of the controllers 20. Furthermore, the controller 20 may be held by the hand of the user, or may be worn on a part of the body such as an elbow, an arm, a knee, an ankle, or a thigh. The user can operate image capturing in the virtual space by the controller 20.

Furthermore, the information (VR content) of the virtual space provided by the display device 10 can be acquired from the information processing apparatus 30. The information processing apparatus 30 may be a server provided on a network, or may be realized by a dedicated terminal arranged in the same space as the user, a smartphone, a tablet terminal, a PC, and the like. Furthermore, the information processing apparatus 30 may be implemented by a plurality of devices. For example, the information processing apparatus 30 may be realized by a server provided on a network and a dedicated terminal arranged in the same space as the user.

The information processing apparatus 30 has a function of storing VR content and providing a virtual space constructed on the basis of the VR content to the display device 10. Specifically, the information processing apparatus 30 generates a free viewpoint image from the VR content according to a motion of the user, a controller operation, and the like, and outputs the free viewpoint image to the display device 10. The movement of the user is a change in the position and posture (including the orientation of the head) of the user. The display device 10 detects the position and posture of the user and outputs the position and posture to the information processing apparatus 30. The information processing apparatus 30 recognizes a user viewpoint position (three-dimensional position) in the real world and calculates a user viewpoint position in the virtual space on the basis of the recognized user viewpoint position.

Note that the processing of generating the free viewpoint image from the VR content described above according to the motion of the user, the controller operation, and the like may be performed by the display device 10.

BACKGROUND

Here, as a means for further enjoying the virtual space experience, such as leaving a specific scene in the virtual space as a memory or sharing with friends, there is a function of image capturing in the virtual space.

Currently, as a scene saving method in a case where moving image distribution is viewed on a smartphone and the like, there is a screenshot function of saving a moving image shown on a display screen as a still image. However, since it is a still image of a video simply drawn on the display screen, a sense of reality such as a photograph captured on site cannot be obtained.

On the other hand, if image capturing can be performed from the user's viewpoint in the virtual space, a realistic on-site photograph can be acquired. Furthermore, if a photograph captured in this way can be shared with friends, VR content can be further enjoyed, the value of VR content can be improved, and this can also contribute to expansion of business scale.

Furthermore, if a photograph captured in the virtual space can be viewed at hand in the virtual space, the user can enjoy the captured photograph while continuing the sense of immersion in the virtual space. Furthermore, in a case where a music concert is viewed as VR, content, or the like, it is assumed that it is desired to gaze at a viewing target while taking a picture of a favorite scene, and thus, it is desirable to reduce troublesome operations in image capturing and viewing as much as possible.

Therefore, in the information processing system according to the present disclosure, it is possible to reduce botheration of operations by performing image capturing to arrangement of a captured image according to a user operation of imaging a subject in a virtual space, and to further enhance entertainment of an image capturing experience in the virtual space by arranging the captured image in the virtual space as a virtual object.

Figure 2:
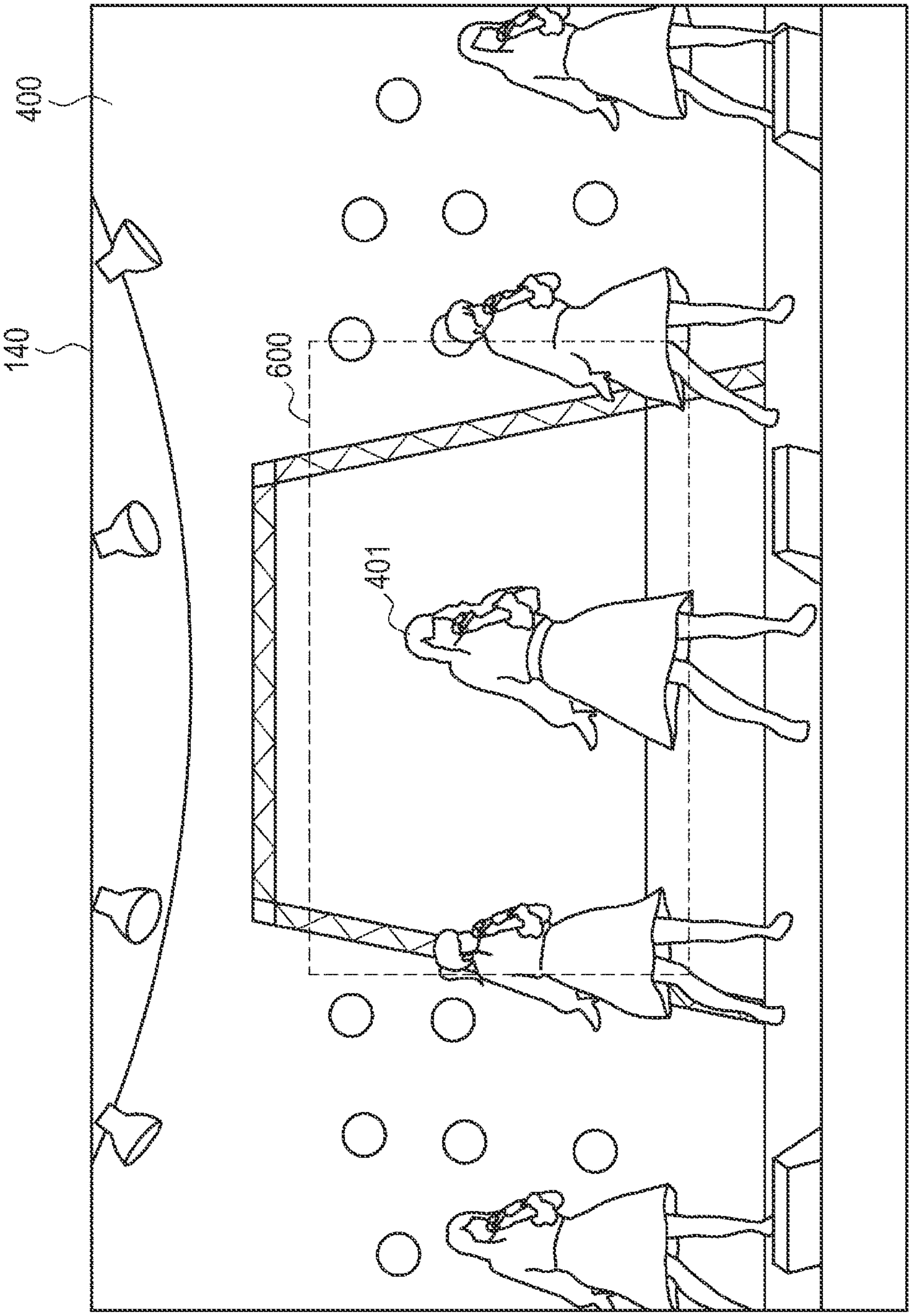
FIG. 2 is a diagram illustrating an example of a virtual space video from a user's viewpoint according to the present embodiment.

Specifically, for example, as illustrated in FIG. 2, in a case where a video 400 of the virtual space is displayed on a display unit 140 of the display device 10, it is assumed that the user performs image capturing of a subject 401 shown in the video 400 using the controller 20. The user can release a so-called shutter by an image capturing operation such as pressing a predetermined button of the controller 20. In the present specification, the "subject in the virtual space" is an image displayed on the display unit 140 as information of the virtual world. The "subject in the virtual space" may be, for example, a person or an object included in a stereoscopic image generated on the basis of a live-action video, or may be a 3D model (virtual object) generated by CG and the like. Furthermore, the "image capturing operation" is an example of an imaging trigger for imaging the subject in the virtual space.

In a case where an image capturing operation such as pressing a predetermined button is performed by the controller 20, the information processing apparatus 30 regards that the shutter is released, and acquires (generates) an image with a predetermined angle of view 600 (frame size) on the basis of the user's viewpoint in the virtual space. Generation of such an image corresponds to so-called "image capturing". Note that an imaging processing unit 302 may display the display of the angle of view 600 in the virtual space. As a result, the user can intuitively grasp the angle of view (image capturing range) in image capturing. For example, the imaging processing unit 302 may cause the angle of view 600 (frame) to appear by a half-press operation of a predetermined button of the controller 20 by the user, and execute image capturing when the button is pressed as it is (by a full-press operation). Furthermore, the information processing apparatus 30 may also be able to operate zoom-in and zoom-out in image capturing.

The information processing apparatus 30 renders (generates) a 2D texture (two-dimensional image) with the angle of view 600, and draws the 2D texture on a photographic object (virtual object used as a photographic image). The photographic object on which the 2D texture is drawn corresponds to a "captured image" (photograph obtained by so-called image capturing operation) in the virtual space.

Figure 3:
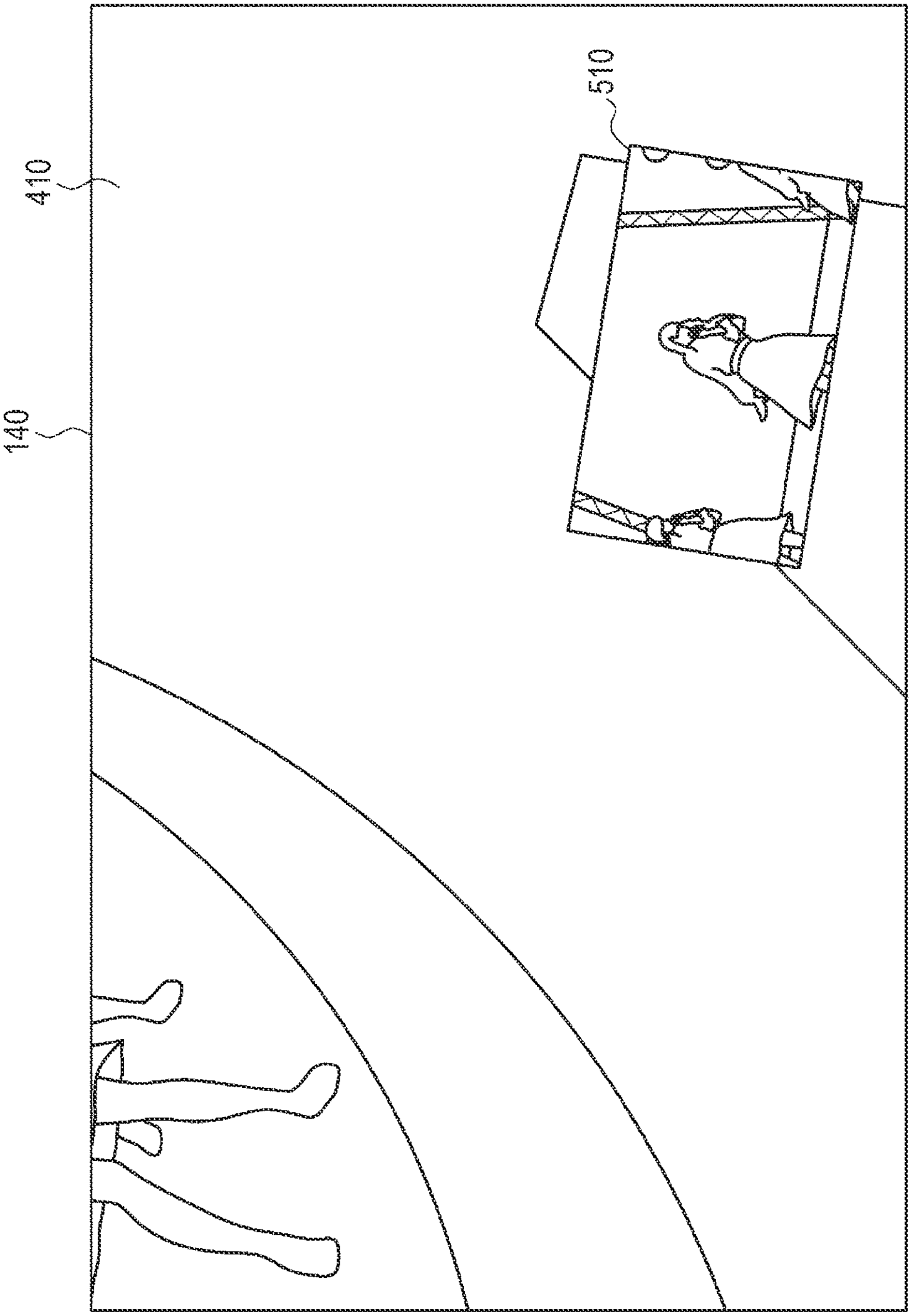
FIG. 3 is a diagram illustrating an arrangement of a captured image in a virtual space according to the present embodiment.

Then, the information processing apparatus 30 arranges the captured image in the virtual space. The arrangement place may be, for example, a position that does not disturb the user's field of view, such as a side of the user (at least a position that does not cover a stage or other positions). For example, as illustrated in FIG. 2, in a case where the user captures the subject 401 while viewing a stage direction, the captured image (image with angle of view 600) may be arranged on a right side (outside the field of view) of the user. In this case, when the user faces the right side (faces the right side), the user's viewpoint in the virtual space changes, and the video 410 of the virtual space in a right direction is displayed on the display unit 140 as illustrated in FIG. 3. Then, a captured image 510 (virtual object) arranged on the right side of the user can be visually recognized.

The overview of the information processing system according to the embodiment of the present disclosure has been described above. Subsequently, a specific configuration of each device included in the information processing system according to the present embodiment will be described with reference to the drawings.

2. Configuration Example

2-1. Configuration Example of Display Device 10

Figure 4:
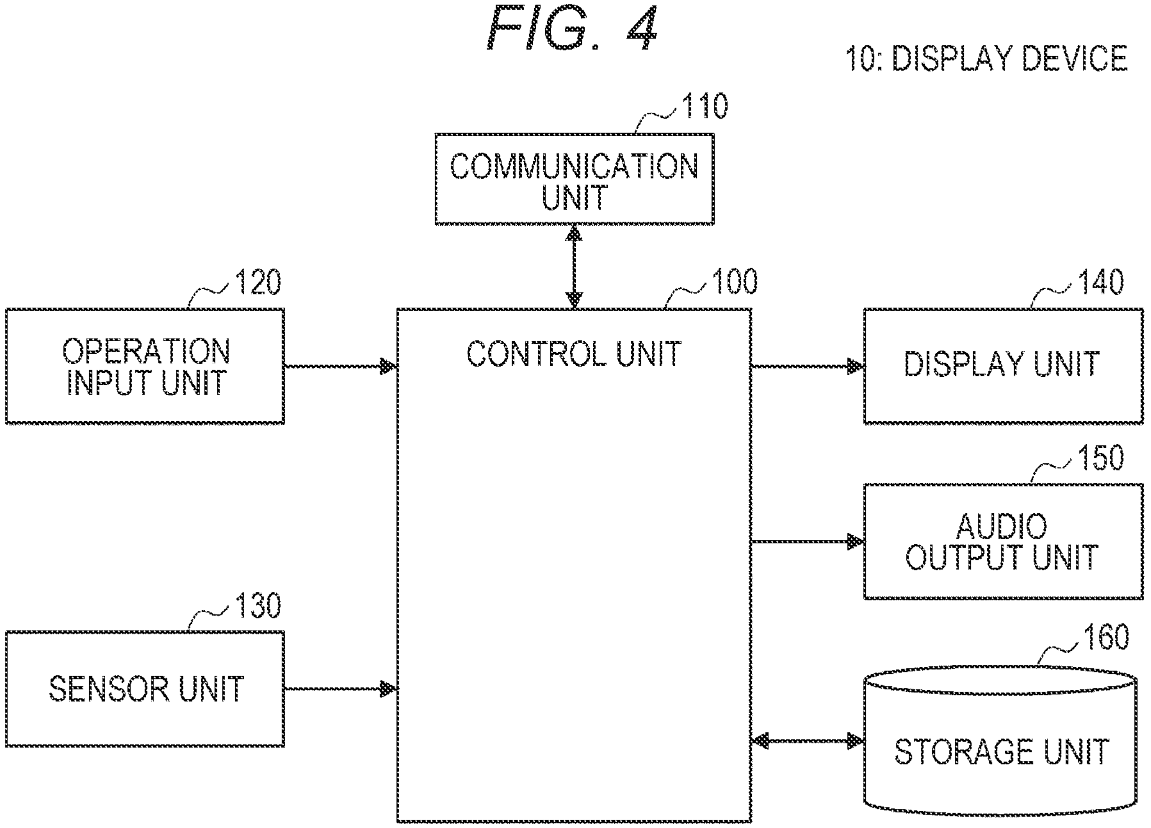
FIG. 4 is a block diagram illustrating an example of a configuration of a display device according to the present embodiment.

FIG. 4 is a block diagram illustrating an example of a configuration of the display device 10 according to the present embodiment. As illustrated in FIG. 4, the display device 10 includes a control unit 100, a communication unit 110, an operation input unit 120, a sensor unit 130, the display unit 140, an audio output unit 150, and a storage unit 160.

The control unit 100 functions as an arithmetic processing device and a control device, and controls the overall operation in the display device 10 according to various programs. The control unit 100 is realized by, for example, an electronic circuit such as a central processing unit (CPU) or a microprocessor. Furthermore, the control unit 100 may include a read only memory (ROM) that stores programs, operation parameters, and the like to be used, and a random access memory (RAM) that temporarily stores parameters and the like that change appropriately.

The control unit 100 according to the present embodiment controls the display unit 140 and the audio output unit 150 on the basis of the information received from the information processing apparatus 30 via the communication unit 110, and performs control to present the information of the virtual space to the visual sense or auditory sense of the user. Furthermore, the control unit 100 performs control to transmit, from the communication unit 110 to the information processing apparatus 30, a change in the position, posture, and the like of the user based on the information of the user operation input from the operation input unit 120 or the data sensed by the sensor unit 130. Furthermore, the control unit 100 also performs control to transmit the information of a user operation received from the controller 20 to the information processing apparatus 30. Furthermore, the control unit 100 may control the display unit 140 and the audio output unit 150 according to the information of the user operation and the change in the position, posture, and the like to change the information of the virtual space presented to the user's vision or hearing.

Calculation of the position, posture, and the like by the control unit 100 based on the sensing data sensed by the sensor unit 130 will be described. The control unit 100 follows the movement of a head of the user (head tracking), follows the movement of a line-of-sight (eye tracking), and follows the position and posture (position tracking) on the basis of various types of sensing data. More specifically, for example, the head tracking can be performed by calculating posture information of the head on the basis of detection results of nine axes detected by the sensor unit 130 provided in the display device 10 worn on the head of the user. Furthermore, the eye tracking can be performed by calculating the line-of-sight (line-of-sight direction) of the user on the basis of a captured image of the user's eye (for example, an infrared image obtained by imaging reflection of infrared light emitted to the eye) detected by the sensor unit 130 provided in the display device 10 worn on the user's head. Furthermore, the position tracking includes an outside-in method using a sensor installed outside, an inside-out method using a sensor mounted on a measurement target itself (display device 10 (HMD)), and a hybrid method which is a combination thereof.

Communication Unit 110

The communication unit 110 communicates with and connects to the information processing apparatus 30 and the controller 20 in a wired or wireless manner to transmit and receive data. The communication unit 110 can perform communication using, for example, a wired/wireless local area network (LAN), Wi-Fi (registered trademark), Bluetooth (registered trademark), infrared communication, a mobile communication network (long term evolution (LTE), third generation mobile communication system (3G), fourth generation mobile communication system (4G), and fifth generation mobile communication system (5G)), and the like.

Operation Input Unit 120

The operation input unit 120 accepts an operation instruction by the user and outputs the operation content to the control unit 100. The operation input unit 120 may be, for example, a touch sensor, a pressure sensor, or a proximity sensor. Alternatively, the operation input unit 120 may have a physical configuration such as a button, a switch, and a lever.

Sensor Unit 130

The sensor unit 130 has a function of sensing a real space such as a user or a surrounding situation. Specifically, the sensor unit 130 includes a position information acquisition unit, a camera (inward/outward camera), a microphone, an acceleration sensor, an angular velocity sensor, a geomagnetic sensor, a biological sensor (detection of pulse, heart rate, sweating, blood pressure, body temperature, respiration, myoelectric value, brain wave, and the like), and the like. Note that specific examples of the sensor unit 130 are not limited thereto, and for example, the sensor unit 130 may include a sensor capable of detecting a total of nine axes of a three-axis gyro sensor, a three-axis acceleration sensor, and a three-axis geomagnetic sensor. Furthermore, the sensor unit 130 may include, as a line-of-sight detection sensor that detects the line-of-sight of the user, for example, an inward camera such as an infrared sensor (an infrared light emitting unit and an infrared camera) provided around the display unit 140 located in front of the eyes of the user, a myoelectric sensor that detects movement of muscles around the eyes of the user, an electroencephalogram sensor, and the like.

Display Unit 140

For example, in a case where the display device 10 is configured as an HMD, the display unit 140 includes left and right screens respectively fixed to the left and right eyes of the user, and displays the left-eye image and the right-eye image. A screen of the display unit 140 includes, for example, a display panel such as a liquid crystal display (LCD) or an organic electro luminescence (EL) display, or a laser scanning display such as a retina direct drawing display. Furthermore, the display unit 140 may include an imaging optical system that enlarges and projects the display screen to form an enlarged virtual image having a predetermined angle of view on the user's pupil.

Audio Output Unit 150

For example, in a case where the display device 10 is configured as an HMD, the audio output unit 150 is configured as a headphone worn on the head of the user and reproduces an audio signal. Note that the audio output unit 150 is not limited to the headphone type, and may be configured as an earphone or a bone conduction speaker.

Storage Unit 160

The storage unit 160 is realized by a read only memory (ROM) that stores programs, operation parameters, and the like used for processing of the control unit 100, and a random access memory (RAM) that temporarily stores parameters and the like that change appropriately.

Although the configuration of the display device 10 has been specifically described above, the configuration of the display device 10 according to the present disclosure is not limited to the example illustrated in FIG. 4. For example, the display device 10 may be realized by a plurality of devices. Specifically, a display device (corresponding to at least the display unit 140) implemented by an HMD and the like and an information processing terminal (corresponding to at least the control unit 100) implemented by a smartphone, a tablet terminal, a PC, and the like may be included. Furthermore, the tracking processing by the control unit 100 described above may be performed by an external device.

Furthermore, each function of the control unit 100 may be realized by a server (for example, the information processing apparatus 30) provided on a network, or may be realized by a dedicated terminal, a smartphone, a tablet terminal, a PC, and the like arranged in the same space as the user.

Furthermore, the display device 10 may be a non-wearable device such as a smartphone or a tablet terminal.

2-2. Configuration Example of Controller 20

Figure 5:
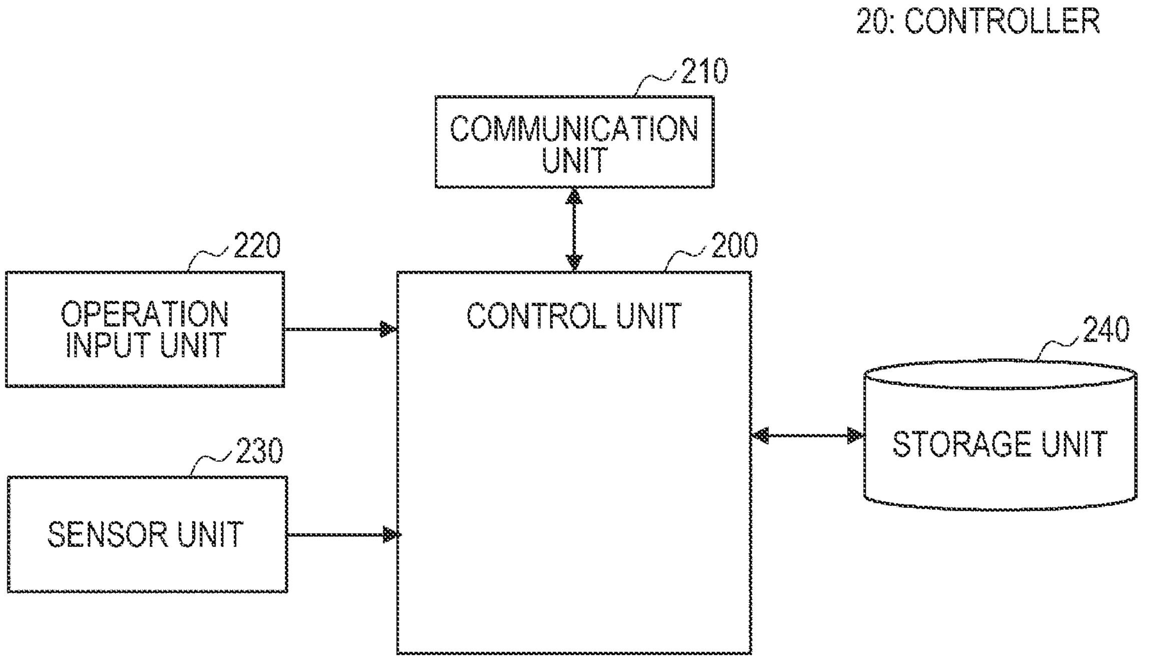
FIG. 5 is a block diagram illustrating an example of a configuration of a controller according to the present embodiment.

FIG. 5 is a block diagram illustrating an example of a configuration of the controller 20 according to the present embodiment. As illustrated in FIG. 5, the controller 20 includes a control unit 200, a communication unit 210, an operation input unit 220, a sensor unit 230, and a storage unit 240.

The control unit 200 functions as an arithmetic processing device and a control device, and controls the overall operation in the controller 20 according to various programs. The control unit 200 is realized by, for example, an electronic circuit such as a central processing unit (CPU) or a microprocessor. Furthermore, the control unit 200 may include a read only memory (ROM) that stores programs, operation parameters, and the like to be used, and a random access memory (RAM) that temporarily stores parameters and the like that change appropriately.

The control unit 200 according to the present embodiment performs control to transmit, from the communication unit 210 to the controller 20, a change in the motion of the user based on the information of the user operation input from the operation input unit 220 and the data sensed by the sensor unit 230. For example, the control unit 200 detects that a button provided in the controller 20 is pressed (an example of an image capturing operation) and outputs the button to the display device 10.

Communication Unit 210

The communication unit 210 communicates with and connects to the controller 20 in a wired or wireless manner to transmit and receive data. The communication unit 210 can perform communication using, for example, a wired/wireless local area network (LAN), Wi-Fi (registered trademark), Bluetooth (registered trademark), infrared communication, a mobile communication network (long term evolution (LTE), third generation mobile communication system (3G), fourth generation mobile communication system (4G), and fifth generation mobile communication system (5G)), and the like.

Operation Input Unit 220

The operation input unit 220 accepts an operation instruction by the user and outputs the operation content to the control unit 200. The operation input unit 220 may be, for example, a touch sensor, a pressure sensor, or a proximity sensor. Alternatively, the operation input unit 220 may have a physical configuration such as a button, a switch, and a lever.

Sensor Unit 230

The sensor unit 230 has a function of sensing a real space such as a user or a surrounding situation. Specifically, the sensor unit 230 may be a sensor capable of detecting a total of nine axes of a three-axis gyro sensor, a three-axis acceleration sensor, and a three-axis geomagnetic sensor. Furthermore, the sensor unit 230 may further include a camera, a microphone, a biological sensor (detection of pulse, sweating, blood pressure, body temperature, and the like), and the like.

Storage Unit 240

The storage unit 240 is realized by a read only memory (ROM) that stores programs, operation parameters, and the like used for processing of the control unit 200, and a random access memory (RAM) that temporarily stores parameters and the like that change appropriately.

Although the configuration of the controller 20 has been specifically described above, the configuration of the controller 20 according to the present disclosure is not limited to the example illustrated in FIG. 5. For example, the controller 20 may further include a display unit, a vibration unit, a light emitting unit, and the like. The controller 20 can perform feedback from the display unit, a vibration unit, a light emitting unit, and the like to the user according to a control signal received from the display device 10.

Furthermore, the controller 20 may be a controller dedicated to operating the VR content, or may be a general-purpose device such as a smartphone, a mobile phone terminal, or a wearable device such as a smart watch.

Note that, in the present embodiment, a system configuration including the controller 20 is used as an example, but the present disclosure is not limited thereto. The user can also convey the user's intention to the system by, for example, a gesture with a hand or the entire body, a voice, and the like without using the controller 20. The gesture input or the voice input may be detected by an outward camera or a microphone provided in the display device 10 (HMD). Furthermore, the gesture input may be detected by a camera (not illustrated) that is provided around the user and captures the entire body of the user, and may be transmitted to the display device 10 or the information processing apparatus 30.

2-3. Configuration Example of Information Processing Apparatus 30

Next, a configuration example of the information processing apparatus 30 will be described with reference to FIG. 6. The information processing apparatus 30 may be a server provided on a network, or may be a dedicated terminal arranged in the same space as the user, a smartphone, a tablet terminal, a PC, and the like.

Figure 6:
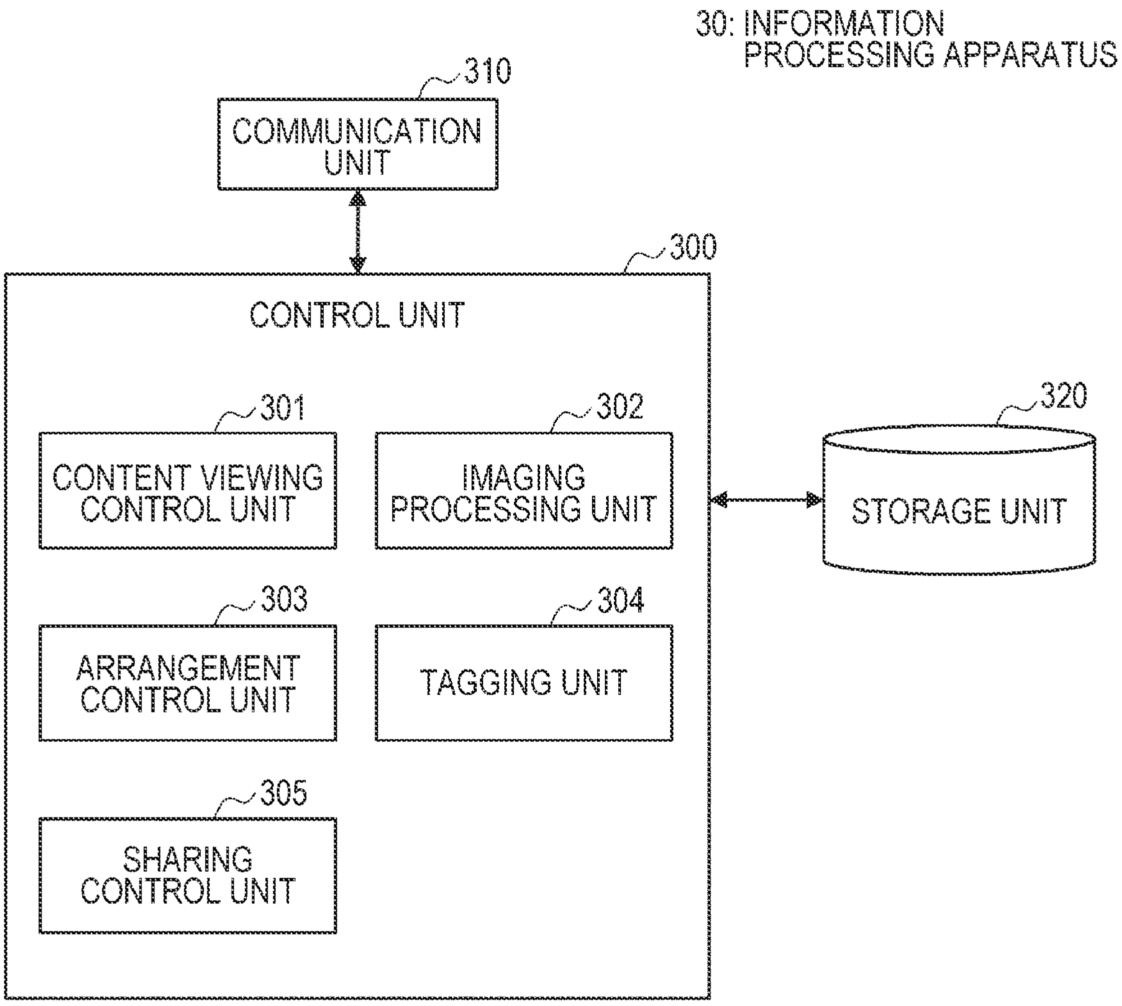
FIG. 6 is a block diagram illustrating an example of a configuration of an information processing apparatus according to the present embodiment.

FIG. 6 is a block diagram illustrating an example of a configuration of the information processing apparatus 30 according to the present embodiment. As illustrated in FIG. 6, the information processing apparatus 30 includes a control unit 300, a communication unit 310, and a storage unit 320.

The control unit 300 functions as an arithmetic processing device and a control device, and controls the overall operation in the information processing apparatus 30 according to various programs. The control unit 300 is realized by, for example, an electronic circuit such as a central processing unit (CPU) or a microprocessor. Furthermore, the control unit 300 may include a read only memory (ROM) that stores programs, operation parameters, and the like to be used, and a random access memory (RAM) that temporarily stores parameters and the like that change appropriately.

Furthermore, the control unit 300 according to the present embodiment also functions as a content viewing control unit 301, an imaging processing unit 302, an arrangement control unit 303, a tagging unit 304, and a sharing control unit 305.

The content viewing control unit 301 has a function of controlling viewing of VR content. Specifically, the content viewing control unit 301 generates a video (free viewpoint image) of the virtual space corresponding to the user viewpoint (three-dimensional position coordinates) in the virtual space (three-dimensional virtual space) constructed (defined) by the VR content on the basis of the information of the VR content stored in the storage unit 320. The content viewing control unit 301 can recognize the user's viewpoint in the virtual space from, for example, the position and posture (including an orientation of the head) of the user calculated on the basis of the sensing data output from the display device 10. Furthermore, the content viewing control unit 301 transmits the generated video of the virtual space from the communication unit 310 to the display device 10, and causes the display unit 140 to display the video. Furthermore, the content viewing control unit 301 generates audio information of the virtual space corresponding to the user viewpoint described above on the basis of the information of the VR content, and transmits the audio information to the display device 10.

By continuously performing the above processing, when the user moves back and forth and left and right in the real world (or inputs an operation instructing to move back and forth and left and right by the controller 20) or changes the viewpoint (for example, the orientation of the head), the content viewing control unit 301 can move back and forth and left and right by the same movement amount (or corresponding movement amount at a predetermined ratio) even in the virtual space or change the viewpoint. As a result, a sense of immersion in the virtual space can be enhanced, and a more realistic VR experience can be provided.

The imaging processing unit 302 performs processing of imaging a subject in the virtual space. Specifically, in a case where an image capturing operation (for example, pressing a predetermined button by the controller 20, and the like) is performed by the user, the imaging processing unit 302 acquires (generates) an image with a predetermined angle of view (a frame size specified vertically and horizontally) (in the user's field of view) on the basis of the user's viewpoint in the virtual space. The acquired image may be a two-dimensional image or a three-dimensional image. Then, the imaging processing unit 302 draws the acquired image with the angle of view 600 (for example, 2D texture) on the photographic object, and generates a "captured image" in the virtual space (virtual object that can be handled in the virtual space). Furthermore, the imaging processing unit 302 may appropriately perform filtering processing at the time of imaging, such as excluding additional virtual objects overlapping with the subject.

The arrangement control unit 303 performs control to arrange the captured image generated by the imaging processing unit 302 in the virtual space. The arrangement may be performed according to a preset arrangement rule. For example, the arrangement control unit 303 arranges the virtual space at a place set in advance with respect to the position of the user who views the virtual space. For example, the arrangement control unit 303 may be arranged outside the field of view of the user. Furthermore, the arrangement control unit 303 may arrange in a place around the user and avoiding a viewing target (which can be set in advance) that is a main of the content being viewed, such as a stage in the virtual space, a distributor (performer and the like), and a traveling direction. Furthermore, the arrangement control unit 303 rearranges the captured image arranged in the virtual space at an arbitrary position (manual pasting position) designated by the user according to the user operation. Furthermore, the arrangement control unit 303 can automatically align in a predetermined space in the virtual space the captured image manually arranged.

The tagging unit 304 performs processing of adding accompanying information (referred to as a "tag" in the present specification) regarding the captured image to the captured image generated by the imaging processing unit 302. For example, the tagging unit 304 acquires information on a subject appearing in the captured image, an image capturing date and time, information regarding the VR content captured, information on a time when the VR content was captured on a reproduction time axis of the VR content (reproduction start position), and the like, and adds the information to the captured image as a tag. Such a tag can be used when searching for a captured image, arranging a large number of captured images in groups, starting reproduction, and the like.

The sharing control unit 305 performs control to share the captured image with the outside such as another person (display device of another user) or another system. Specifically, the sharing control unit 305 performs control to transmit a copy of the captured image selected by the user to a share destination (for example, a display device of a friend, a system that provides a service of printing a real object such as a T-shirt, a mug, or paper and delivering the real object to a user's home, and the like.). Furthermore, the sharing control unit 305 performs control to receive a captured image shared by others and store the captured image in the storage unit 320, and to arrange the received captured image in a virtual space viewed by the user.

The various functions of the control unit 300 have been described above. Note that the above-described various functions are examples, and the present embodiment is not limited thereto. For example, the control unit 300 can perform various notifications and feedback to the user by display or sound in the virtual space, vibration of the display device 10 or the controller 20, and the like.

Communication Unit 310

The communication unit 310 transmits and receives data to and from the display device 10 in a wired or wireless manner. The communication unit 310 is communicably connected to the display device 10 by, for example, a wired/wireless local area network (LAN), Wi-Fi (registered trademark), Bluetooth (registered trademark), a mobile communication network (long term evolution (LTE), third generation mobile communication system (3G), fourth generation mobile communication system (4G), and fifth generation mobile communication system (5G)), and the like.

Storage Unit 320

The storage unit 320 is realized by a read only memory (ROM) that stores programs, operation parameters, and the like used for processing of the control unit 300, and a random access memory (RAM) that temporarily stores parameters and the like that change appropriately.

According to the present embodiment, the storage unit 320 stores the VR content. Furthermore, the storage unit 320 may store user information (User's name, ID, address, and the like).

Although the configuration of the information processing apparatus 30 has been specifically described above, the configuration of the information processing apparatus 30 according to the present disclosure is not limited to the example illustrated in FIG. 6. For example, the information processing apparatus 30 may be implemented by a plurality of devices. Specifically, the control unit 300 may be provided in an information processing terminal realized by a smartphone, a tablet terminal, a PC, and the like, or a dedicated terminal arranged in the same space as the user, and the storage unit 320 may be provided in a server on the network. Furthermore, at least some of the functions of the control unit 300 may be executed by the display device 10. Furthermore, the information processing apparatus 30 may be realized by the display device 10, an information processing terminal (smartphone, tablet terminal, PC, and the like) or a dedicated terminal, and a server.

3. Operation Processing

Next, operation processing of the information processing system according to the present embodiment will be specifically described with reference to the drawings.

3-1. Imaging Processing

Figure 7:
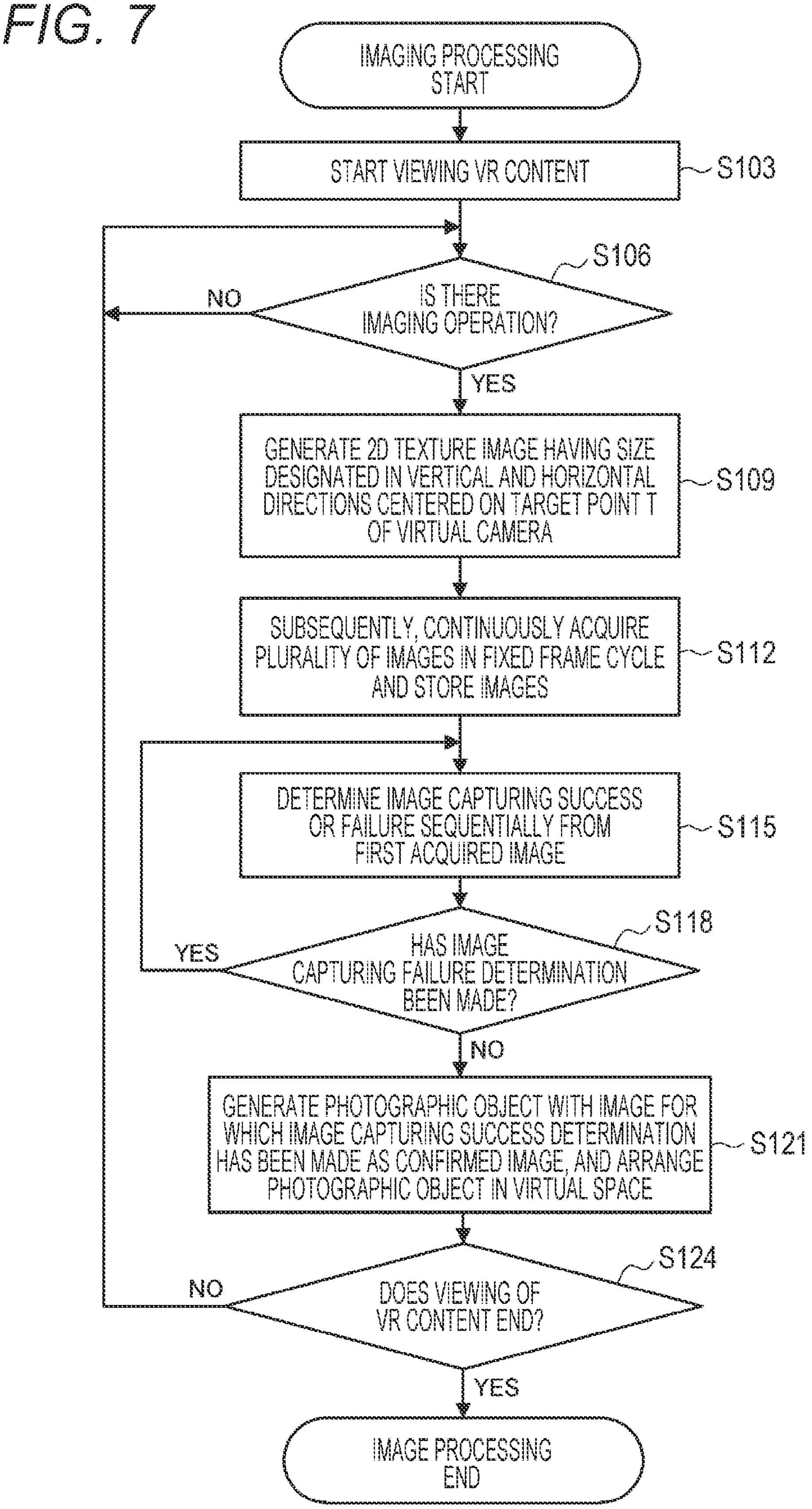
FIG. 7 is a flowchart illustrating an example of a flow of imaging processing according to the present embodiment.

FIG. 7 is a flowchart illustrating an example of a flow of imaging processing according to the present embodiment. As illustrated in FIG. 7, first, the display device 10 starts viewing the VR content on the basis of the information acquired from the information processing apparatus 30 (step S103). Specifically, the viewing control of the VR content is performed by the content viewing control unit 301 of the information processing apparatus 30, and the image and audio at the user's viewpoint in the virtual space are generated and transmitted to the display device 10.

Next, the imaging processing unit 302 of the information processing apparatus 30 determines whether or not there is an imaging operation (operation input intended to perform image capturing) on the basis of the user's operation information acquired from the display device 10 or the controller 20 (step S106). For example, the imaging processing unit 302 may recognize that a predetermined button provided in the controller 20 is pressed as the imaging operation.

Figure 8:
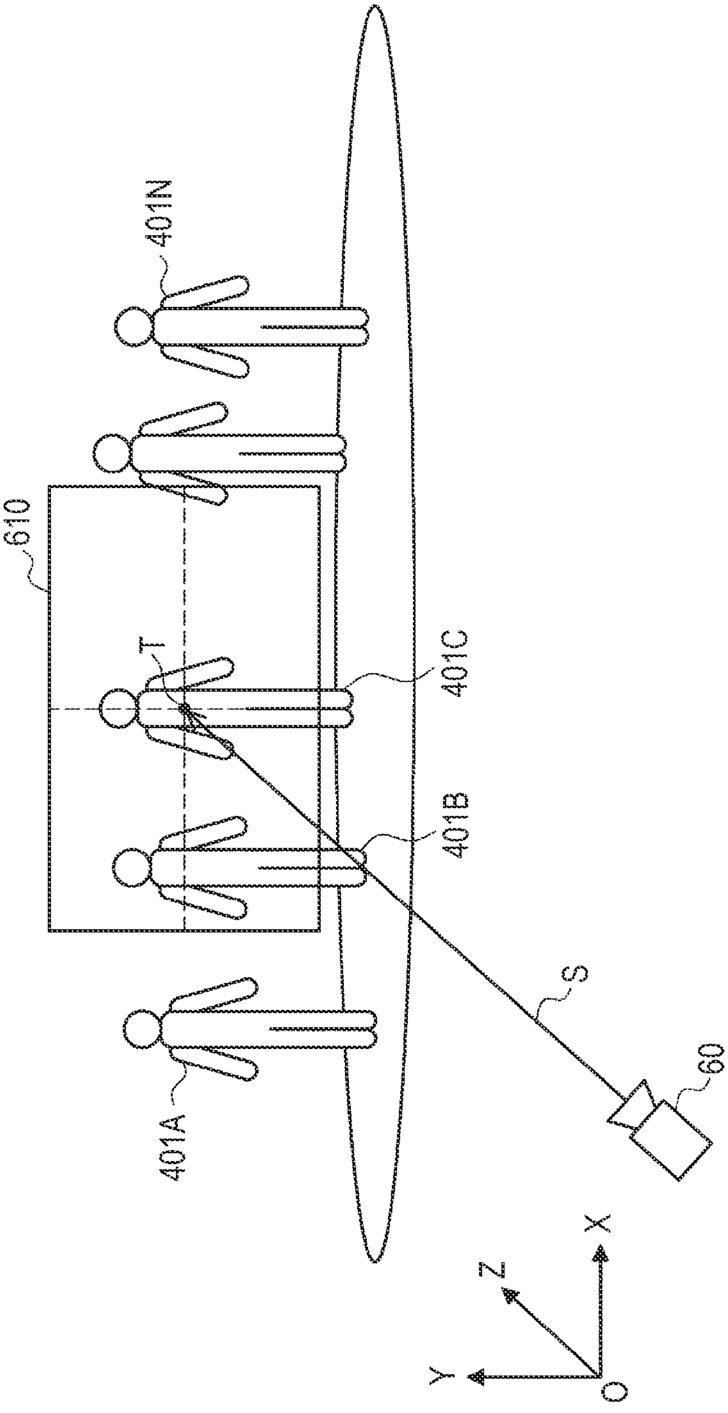
FIG. 8 is a diagram for explaining image acquisition according to an image capturing operation according to the present embodiment.

Next, in a case where there is an imaging operation (step S106/YES), as illustrated in FIG. 8, the imaging processing unit 302 generates a 2D texture (image) having a frame size (that is, a size of an angle of view 610) designated in vertical and horizontal directions centered on a target point T at which a center axis S of a virtual camera 60 (that is, the user's viewpoint) is orthogonal to an object (here, a subject 401C) in the virtual space as the center (step S109). Note that the frame size (the size of the angle of view 610) of the acquired image may be set in advance, or may be arbitrarily set by the user. In this manner, the imaging processing unit 302 acquires an image of a part of the field of view of the user viewing the virtual space (a part of a display range of the display unit 140). Note that, in FIG. 8, the target point T is determined in order to use a three-dimensional position of the subject 401 to be imaged in tagging processing as described later, but the present embodiment is not limited thereto, and the angle of view 610 is a frame of a vertical-horizontal designated size centered on a point at which the center axis is orthogonal to the plane in the plane orthogonal to the center axis S of the virtual camera 60.

Figure 9:
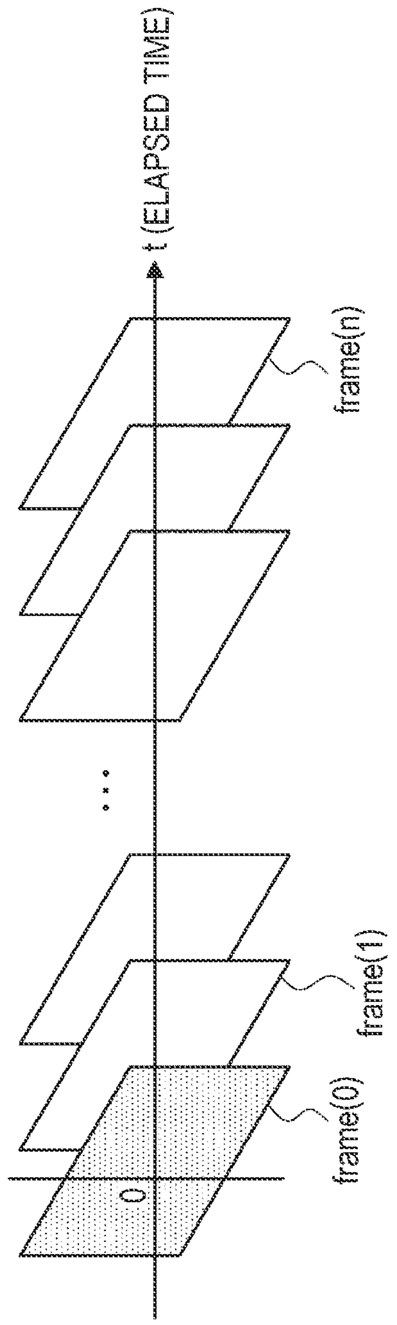
FIG. 9 is a diagram illustrating continuous acquisition of images performed for insurance for failed image capturing according to the present embodiment.

Next, following the acquisition of the image described above, the imaging processing unit 302 continuously acquires a plurality of images in a fixed frame cycle, and stores the images in the storage unit 320 (step S112). That is, as illustrated in FIG. 9, images (at the same angle of view) for n consecutive frames are acquired in a fixed frame cycle from an image capturing start frame (frame 0). The plurality of images is acquired for insurance at the time of failed image capturing. That is, when a moving image is stored as a still image, an image capturing error (A subject is closing eyes, dress of subject is turned up, camera shake, and the like) may occur due to a delay in image capturing timing. Therefore, by acquiring a plurality of image capturing, it is possible to leave a successful image even when an image capturing error occurs. The number of consecutively acquired images may be preset.

Specifically, the imaging processing unit 302 determines image capturing success or failure sequentially from the first acquired image (step S115). For example, eye closure, face orientation, facial expression, dress turn-up, and the like of the subject are detected, and it is determined whether or not a preset image capturing failure state has occurred.

Next, in a case where it is not determined that the image capturing has failed (step S118), the image can be said to be an image for which the image capturing success determination has been made. Therefore, the imaging processing unit 302 generates a photographic object (a virtual object that can be handled in the virtual space) with the image for which the image capturing success determination has been made as a confirmed image, and the arrangement control unit 303 arranges the photographic object in the virtual space (step S121). The arrangement of the photographic object in the virtual space may be performed by the imaging processing unit 302. Furthermore, the arrangement in the virtual space may be arranged at a preset place. Arrangement processing will be described next with reference to FIG. 10.

The processing illustrated in steps S106 to S121 described above can be repeated until the viewing of the VR content ends (step S124). As described above, in the present embodiment, a series of processing from acquisition of the captured image to arrangement in the virtual space is performed according to the image capturing operation by the user, and thus, it is possible to reduce troublesome operation and further enhance entertainment of image capturing experience in the virtual space.

Note that the imaging processing described above may be performed only in a predetermined time zone in which imaging is permitted within the reproduction time of the VR content. Furthermore, the imaging processing unit 302 may be configured to be able to image only a predetermined place or target (only a permitted place or target) in the virtual space.

The imaging processing according to the present embodiment has been described above. Note that the operation processing illustrated in FIG. 7 is an example, and the present disclosure is not limited to the example illustrated in FIG. 7. For example, the present disclosure is not limited to the order of the steps illustrated in FIG. 7. At least one of the steps may be processed in parallel, or may be processed in the reverse order. Furthermore, all the processing illustrated in FIG. 7 may not necessarily be executed. For example, images may be continuously acquired and determination of image capturing success or failure may be performed, and images may be continuously acquired until image capturing is successful.

Furthermore, all the processing illustrated in FIG. 7 may not necessarily be performed by a single device. For example, in the above description, it has been assumed that all the processing illustrated in FIG. 7 is performed by the information processing apparatus 30, but the present disclosure is not limited thereto. For example, all the processing illustrated in FIG. 7 may be performed by the display device 10, or may be performed by the display device 10 and the information processing apparatus 30.

3-2. Arrangement Processing of Captured Image

Next, the arrangement of the captured image (photographic object) illustrated in step S121 described above in the virtual space will be described. The arrangement in the virtual space may be performed randomly around the user's viewpoint or may be performed at a preset place. The preset place is assumed to be, for example, a position that does not disturb viewing of the VR content, that is, a place that does not overlap with a viewing target (for example, a stage, a traveling direction, and the like) that is main in the VR content, such as outside the user's field of view. Hereinafter, a specific description will be given with reference to FIGS. 10 to 12.

Figure 10:
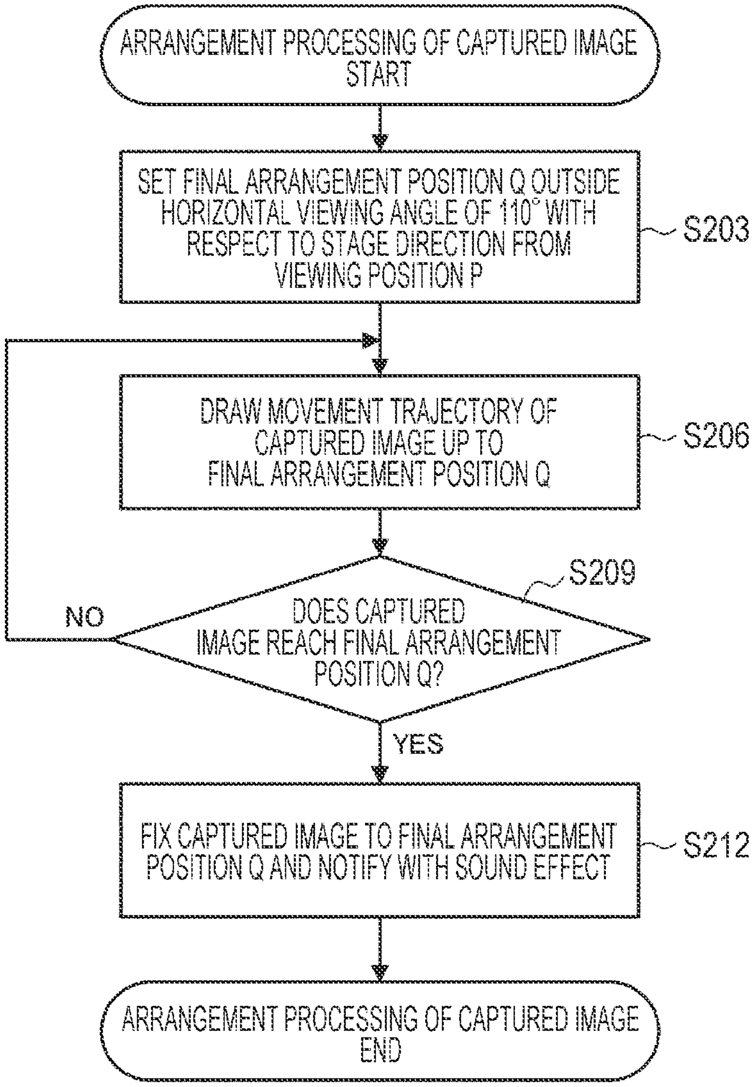
FIG. 10 is a flowchart illustrating an example of a flow of arrangement processing of a captured image according to the present embodiment.
Figure 11:
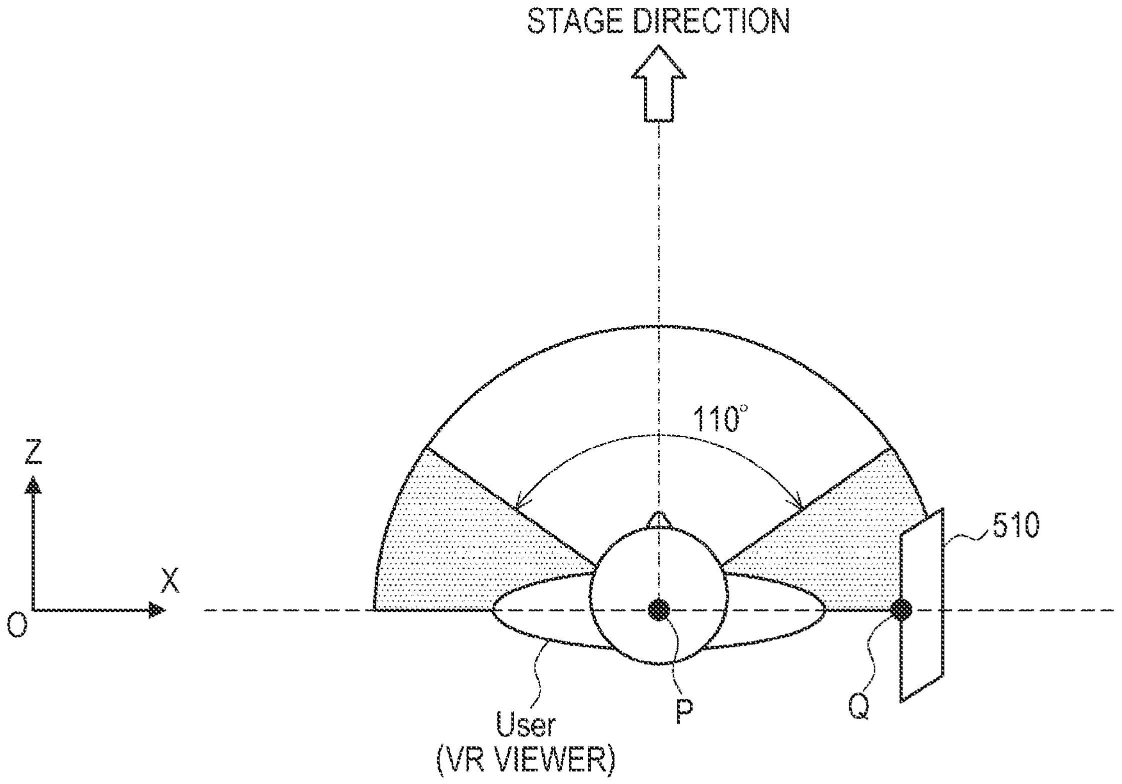
FIG. 11 is a diagram illustrating arrangement positions of captured images according to the present embodiment.

FIG. 10 is a flowchart illustrating an example of a flow of arrangement processing of a captured image according to the present embodiment. FIG. 11 is a diagram illustrating arrangement positions of captured images according to the present embodiment.

As illustrated in FIGS. 10 and 11, first, the arrangement control unit 303 sets a final arrangement position Q outside a horizontal viewing angle of about 110° with respect to a viewing target of the VR content (For example, a stage direction, and the like. Alternatively, it may be a front direction defined in the VR content.) from a viewing position P (user's viewpoint) in the virtual space (step S203). Here, the "horizontal viewing angle of about 110°" is an example of a range of the "field of view" in consideration of the identification viewing angle of a human, but the range (angle) of the "field of view" of the present embodiment is not limited thereto. Furthermore, the definition of the "field of view" is not limited to that considering the identification viewing angle. Furthermore, the arrangement control unit 303 may set the final arrangement position Q at a distance that is out of the user's field of view and within reach of the user's hand.

Next, the arrangement control unit 303 draws a movement trajectory of the captured image up to the final arrangement position Q (step S206). Here, a case where the movement trajectory to the final arrangement position of the captured image is drawn will be described as an example, but the present disclosure is not limited thereto, and the captured image may be arranged at the final arrangement position without drawing the movement trajectory.

Figure 12:
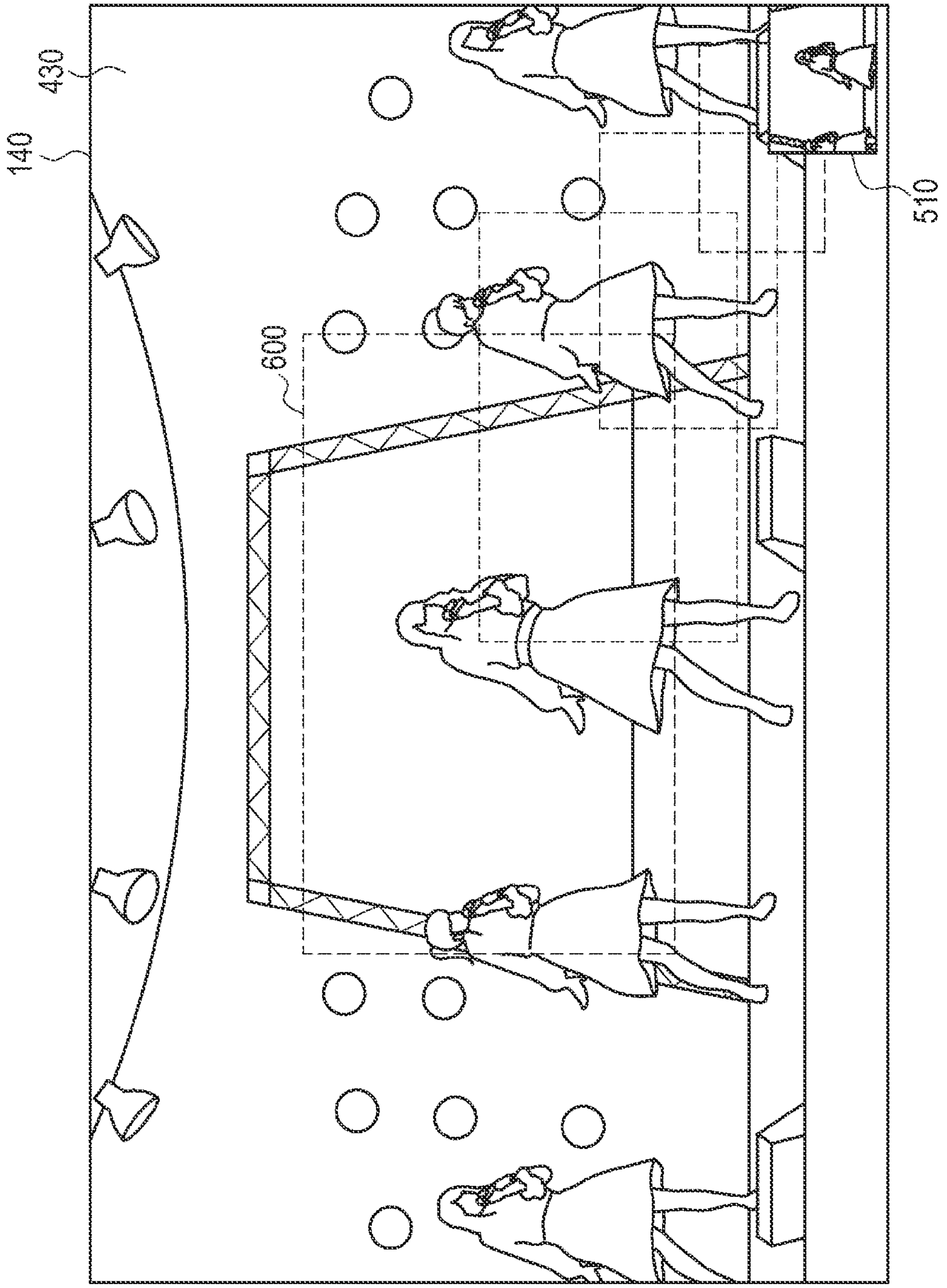
FIG. 12 is a diagram illustrating a case of drawing a movement trajectory to an arrangement position of a captured image according to the present embodiment.

FIG. 12 is a diagram for describing a case of drawing a movement trajectory to an arrangement position of a captured image according to the present embodiment. As illustrated in FIG. 12, for example, in a video 430 of the virtual space displayed on the display unit 140 of the display device 10, when an image capturing operation is performed by the user, a region with an angle of view 600 rises from the video 430, and the captured image 510 moves toward the final arrangement position Q set outside the user's field of view (outside the video 430 of the virtual space displayed on the display unit 140). For example, in a case where the final arrangement position Q is on the right side of the user, an animation in which the captured image 510 fades out to the right of the video 430 while gradually decreasing in size can be presented. As a result, the user can intuitively grasp in which direction the captured image is arranged.

Note that a speed performance (For example, acceleration or deceleration at the start of movement, during movement, at the time of curve, immediately before arrival, and the like) such as an easy curve or a performance such as a curve design of a trajectory may be given to the movement trajectory of the captured image.

Next, when the captured image reaches the final arrangement position Q (step S209/YES), the arrangement control unit 303 fixes the captured image to the final arrangement position Q and notifies the user of the direction of the arrangement position by a sound effect (step S212). For example, in a case where the final arrangement position Q is on the right side of the user, the sound effect can be heard from the right direction, so that the user can intuitively grasp that the captured image is arranged on the right side although the image is not seen in the field of view. Note that the arrangement control unit 303 may perform control to immediately arrange the captured image 510 (photographic object) at the final arrangement position Q according to the image capturing operation without displaying the animation of the movement process described above, and output a sound effect (shutter sound and the like) by sound so as to be heard from an arrangement direction. Here, the notification by sound is exemplified, but the present disclosure is not limited thereto, and notification of the fact that the captured image is arranged outside the field of view, the arrangement direction, the arrangement position, and the like may be provided by display, vibration, and the like. Examples of the display include display of an arrow indicating an arrangement direction.

Furthermore, "fixing the captured image" may be fixing of a relative positional relationship with respect to the user position in the virtual space, or may be fixing of an absolute position in the virtual space. In the case of fixing the relative positional relationship, when the user moves in the virtual space, the captured image arranged beside the user and the like also moves following the movement of the user.

Furthermore, the user can take the captured image 510 (See FIG. 3.) arranged at the final arrangement position Q in the virtual space and move the captured image to another place or enlarge or reduce the captured image. Interaction with the captured image 510 (photographic object) can be performed by an operation of the controller 20 or a gesture. Specifically, for example, the content viewing control unit 301 may display a virtual hand (virtual object in the shape of a hand) reflecting the user's operation, the shape of the hand, the position of the hand, the movement of the hand, and the like in the virtual space so that the captured image 510 can be grasped by the virtual hand. In this case, the enlargement/reduction of the captured image 510 may be performed by, for example, pinching out/in with respect to the captured image 510 with a virtual hand, holding both ends of the captured image 510 with a virtual hand to extend or contract the captured image 510, or holding or opening a virtual hand on the captured image 510. Furthermore, the user can also create an original viewing space by rearranging (manually arranging) each captured image at a desired position. The rearrangement of the captured image will be described later.

Furthermore, the arrangement control unit 303 may superimpose and display a plurality of captured images obtained by a plurality of image capturing operations on the final arrangement position Q. For example, in the example illustrated in FIG. 3, it may be understood that the captured image 510 captured most recently is arranged on the forefront. Furthermore, the arrangement control unit 303 may display a certain number of captured images slightly shifted from each other on a back surface of the captured image 510 so that the user intuitively knows that the plurality of captured images exists at the final arrangement position Q.

The arrangement processing according to the present embodiment has been described above. Note that the operation processing illustrated in FIG. 10 is an example, and the present disclosure is not limited to the example illustrated in FIG. 10. For example, the present disclosure is not limited to the order of the steps illustrated in FIG. 10. At least one of the steps may be processed in parallel, or may be processed in the reverse order. Furthermore, all the processing illustrated in FIG. 10 may not necessarily be executed.

Furthermore, all the processing illustrated in FIG. 10 may not necessarily be performed by a single device. For example, in the above description, it has been assumed that all the processing illustrated in FIG. 10 is performed by the information processing apparatus 30, but the present disclosure is not limited thereto. For example, all the processing illustrated in FIG. 10 may be performed by the display device 10, or may be performed by the display device 10 and the information processing apparatus 30.

3-3. Tag Processing of Captured Image

Figure 13:
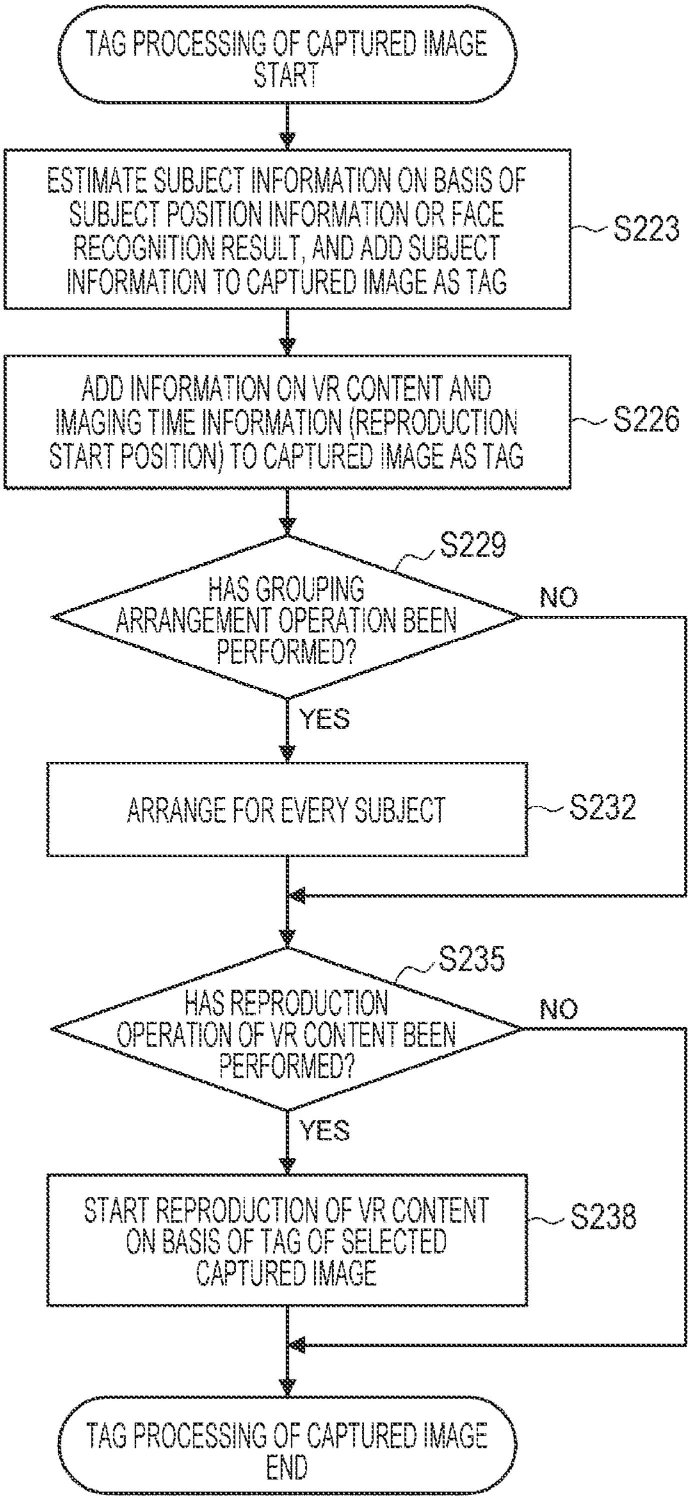
FIG. 13 is a flowchart illustrating an example of a flow of tag processing of a captured image according to the present embodiment.

Next, addition of a tag to the captured image (photographic object) generated in step 3121 described above and use of the tag will be described. FIG. 13 is a flowchart illustrating an example of a flow of tag processing of a captured image according to the present embodiment.

As illustrated in FIG. 13, first, the tagging unit 304 estimates subject information on the basis of the subject position information or the face recognition result shown in the captured image, and adds the subject information to the captured image as a tag (accompanying information) (step S223). The position information of the subject is, for example, three-dimensional position coordinates in the virtual space. For example, in a case where imaging is performed at the angle of view 610 illustrated in FIG. 8, the tagging unit 304 acquires a standing position Pc (Xc, Yc, Zc) of the subject 401C close to the target point T as the position information of the subject. In the case of a concert, a stage, and the like, the standing position of a performer may be determined in advance. The tagging unit 304 can acquire information (subject information) such as who the subject appearing in the captured image is and the name of the subject on the basis of the information regarding the standing position generated in advance and the imaging time and the standing position of the subject. Furthermore, the tagging unit 304 may analyze a face image of a subject and estimate who the subject is on the basis of face recognition. The information for face recognition of a performer and the like in the VR content can be prepared in advance.

Note that the tagging unit 304 basically tags information of a subject appearing at the center of a captured image, but the present disclosure is not limited thereto. For example, the tagging unit 304 may tag information of all subjects appearing in the captured image. Furthermore, the tagging unit 304 may tag information on a subject in focus among the subjects shown in the captured image. Furthermore, the tagging unit 304 may tag information of a subject appearing the largest among the subjects appearing in the captured image.

Next, the tagging unit 304 adds information on the VR content which is imaged and image capturing time information (reproduction start position information) to the captured image as a tag (step S226). The image capturing time information is information on the image capturing time on the reproduction time axis of the VR content that has captured the image, and is handled as a reproduction start position.

The tag adding processing to the captured image has been described above. Next, use of the tag added to the captured image will be described.

For example, in a case where the grouping arrangement operation of the captured images has been performed by the user (step S229/YES), the arrangement control unit 303 performs control to arrange the captured images for every subject (for example, for each of the subject 401A, the subject 401C, and the subject 401D,) on the basis of the subject information given to each captured image, for example (step S232). The arrangement control unit 303 may arrange the plurality of captured images vertically or horizontally for every group, or may arrange the plurality of captured images in an overlapping manner. Furthermore, the place of the grouping arrangement in the virtual space is not particularly limited, and examples thereof include a place that does not overlap with the viewing target (stage, traveling direction, and the like) that is the main of the VR content. More specifically, it may be a place slightly away from the user, a back surface of the user, a hand of the user, an upper side of the user (ceiling, sky, and the like), and the like.

Here, a case where grouping is performed for every subject has been described as an example, but the present embodiment is not limited thereto. The arrangement control unit 303 may arrange the captured images by grouping the captured images by other elements on the basis of the tag attached to each captured image. For example, the arrangement control unit 303 may arrange the images by grouping the images for every scene (scene change), every type of subject, every type of dress, every group of standing positions, and the like. That is, a scene, a type of a subject, a standing position, and the like at the time of imaging can also be added to each captured image as a tag.

Furthermore, in a case where the reproduction operation of the VR content that is an acquisition source of the captured image has been performed on the captured image (step S235/YES), the content viewing control unit 301 performs control to start reproduction of the VR content on the basis of the tag (reproduction start position information) of the selected captured image (step S238). Therefore, the user can reproduce the VR content in the virtual space from the time when the image capturing is performed.

The tag processing according to the present embodiment has been described above. Note that the operation processing illustrated in FIG. 13 is an example, and the present disclosure is not limited to the example illustrated in FIG. 13. For example, the present disclosure is not limited to the order of the steps illustrated in FIG. 13. At least one of the steps may be processed in parallel, or may be processed in the reverse order. Furthermore, all the processing illustrated in FIG. 13 may not necessarily be executed.

Furthermore, all the processing illustrated in FIG. 13 may not necessarily be performed by a single device. For example, in the above description, it has been assumed that all the processing illustrated in FIG. 13 is performed by the information processing apparatus 30, but the present disclosure is not limited thereto. For example, all the processing illustrated in FIG. 13 may be performed by the display device 10, or may be performed by the display device 10 and the information processing apparatus 30.

3-4. Filtering Processing at the Time of Imaging

In step S121 described above, the imaging processing unit 302 according to the present embodiment may perform filtering processing of removing an effect that hinders generation of a captured image, a subject other than a performer (for example, an avatar of another user), and the like.

Figure 14:
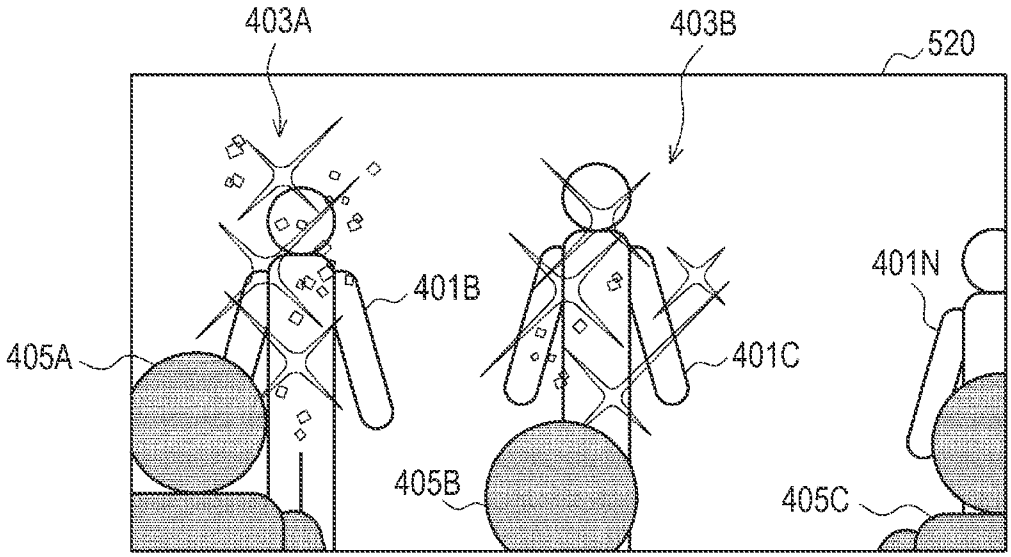
FIG. 14 is a diagram illustrating filtering processing of a captured image according to the present embodiment.

FIG. 14 is a diagram illustrating filtering processing of a captured image according to the present embodiment. As illustrated in FIG. 14, for example, the subject 401C to be a target (close to the target point T) and at least a part of another subject 401B may be hidden in a captured image 520 by an effect image 403 (403A, 403B) or an avatar 405 (405A to 405C) of another user. Therefore, in the present embodiment, it is possible to capture only a subject (a performer, a game character, and the like) that is a main viewing target in VR content.

Figure 15:
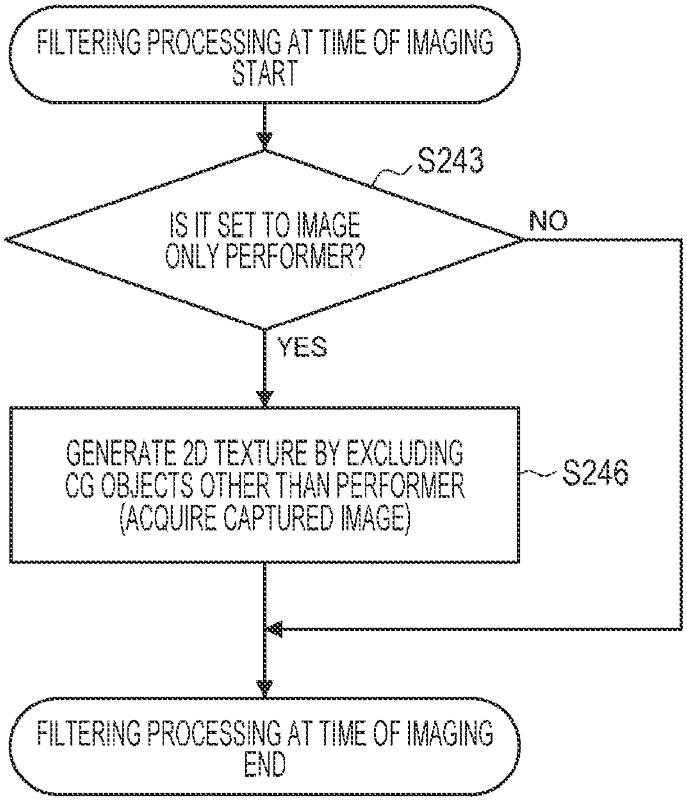
FIG. 15 is a flowchart illustrating an example of a flow of filtering processing at the time of imaging according to the present embodiment.

FIG. 15 is a flowchart illustrating an example of a flow of filtering processing at the time of imaging according to the present embodiment. As illustrated in FIG. 15, in a case where it is set to image only the performer (step S243/YES), the imaging processing unit 302 generates a 2D texture (acquires a captured image) (in the range of the angle of view 600) by excluding CG objects (effects, avatars of other users, and the like) other than the performer (step S245). Here, information such as whether the virtual object is a performer, an effect, or an avatar of another user is given to each virtual object in the virtual space. The imaging processing unit 302 recognizes each virtual object reflected in the angle of view 600, removes virtual objects other than the performer, and then acquires an image. Note that, even in a case where the subject is a part of the stereoscopic image generated from the live-action video, by performing processing of removing an effect or a virtual object including an avatar of another user, it is possible to eliminate a reflection that becomes an obstacle. Note that, although the term "performer" has been described here, in the present embodiment, it is possible to reliably capture an image of a main viewing target in VR content without being disturbed by an additional virtual object for production.

Furthermore, the imaging processing unit 302 may remove the additional virtual object for performance only in a case where the additional virtual object is located in front (in front) of the subject (performer and the like), or may remove the additional virtual object only in a case where the additional virtual object overlaps the subject (performer and the like).

The filtering processing according to the present embodiment has been described above. Note that the operation processing illustrated in FIG. 15 is an example, and the present disclosure is not limited to the example illustrated in FIG. 15.

Furthermore, all the processing illustrated in FIG. 15 may not necessarily be performed by a single device. For example, in the above description, it has been assumed that all the processing illustrated in FIG. 15 is performed by the information processing apparatus 30, but the present disclosure is not limited thereto. For example, all the processing illustrated in FIG. 15 may be performed by the display device 10, or may be performed by the display device 10 and the information processing apparatus 30.

3-5. Rearrangement Processing of Captured Image

Furthermore, in the present embodiment, the user can create an original viewing space by rearranging (manually rearranging) each captured image at a desired position.

Figure 16:
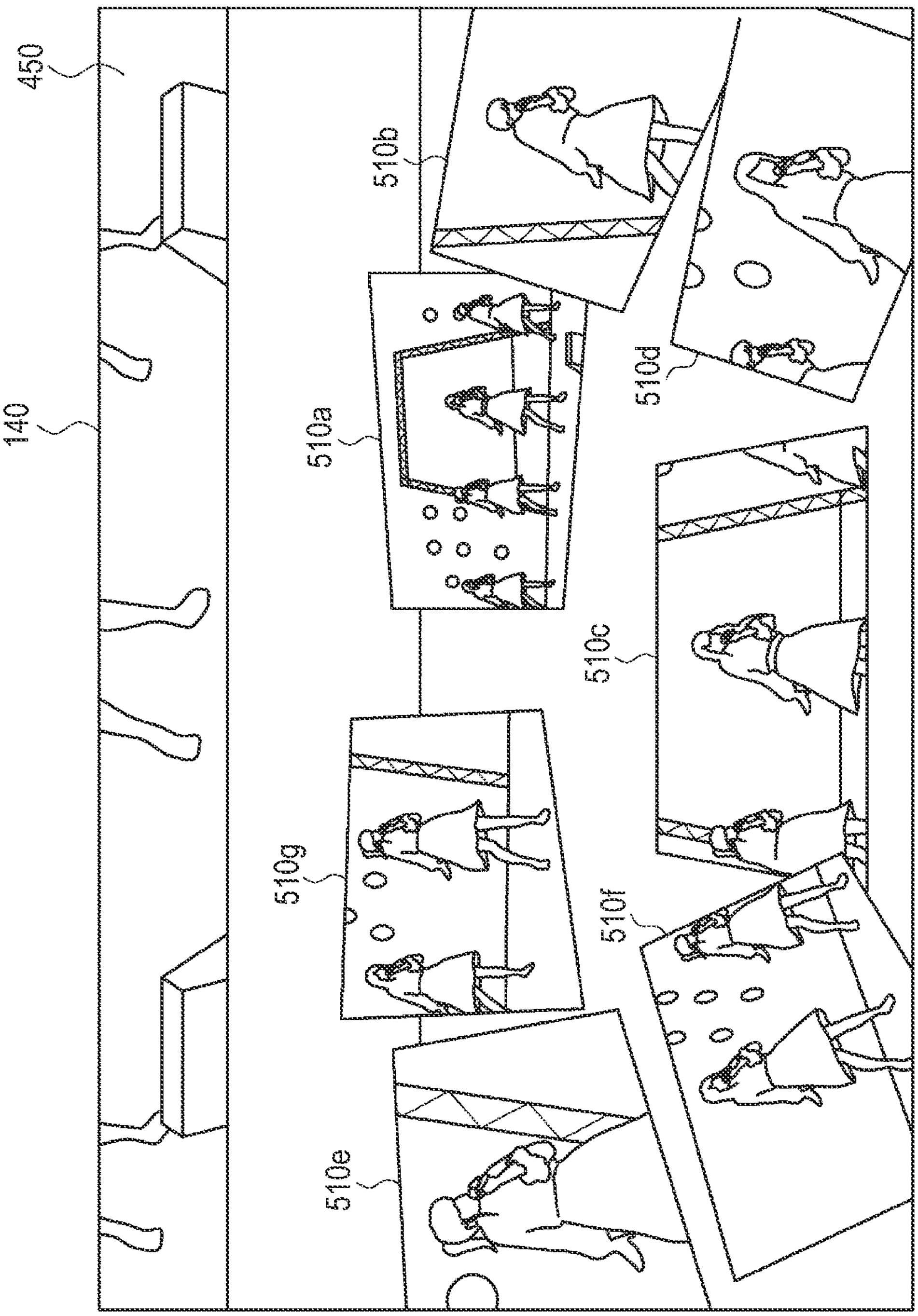
FIG. 16 is a diagram illustrating an example of a manual rearrangement of captured images according to the present embodiment.

More specifically, for example, as illustrated in FIG. 3, the user can select the captured image 510 arranged at a predetermined position according to the image capturing operation with a virtual hand and the like, and move the captured image to another easily viewable place or a favorite place such as in front of the user (stage direction and the like). Here, FIG. 16 illustrates an example of a case where the user manually rearranges a plurality of captured images. As illustrated in FIG. 16, the user can arrange captured images 510*a* to 510*g* at his/her own easily viewable place (for example, in a direction of the front (stage)) in any layout (favorable position and posture). That is, the arrangement control unit 303 of the information processing apparatus 30 performs control to arrange the captured image selected by the user at an arbitrary position specified by the user in an arbitrary posture on the basis of the user operation and the like detected by the controller 20.

The user can experience the creation of his/her own space surrounded by his/her favorite photograph captured by himself/herself while watching the stage. Such an experience is different for every viewer or every distribution, and can be a new VR experience value that energizes the repetitive experience motivation of the VR content. Furthermore, by arranging a large number of photographs so that the original space created by oneself can be imaged (for example, the entire field of view is stored as a still image or a moving image) and shown to other users, motivation for competition between fans can be activated, and contribution to expansion of business scale can be expected.

Note that the manually arranged captured image may be fixed as an absolute arrangement position in the virtual space, or may be fixed as a relative arrangement position with respect to the user position. In the case of the relative arrangement, when the user moves in the virtual space, the captured images 510*a* to 510*g* arranged around the user also move following the movement of the user.

Furthermore, in the present embodiment, in a case where the number of the captured images manually rearranged around the user exceeds an upper limit, in a case where the occupied area by the captured images exceeds a predetermined value, or in other cases, it is also possible to automatically align (automatically rearrange) the plurality of captured images manually arranged at a place slightly away from the user. The alignment arrangement may be an alignment in the vertical direction or the horizontal direction in the virtual space, or an alignment in the depth direction. Such a group of such alignments is hereinafter referred to as an "alignment shelf". The automatic rearrangement (alignment arrangement) may be automatically performed in a case where a predetermined condition is satisfied, such as a case where the number of captured images manually rearranged exceeds a predetermined number, or the user may give an instruction to perform the automatic rearrangement (alignment arrangement).

Figure 17:
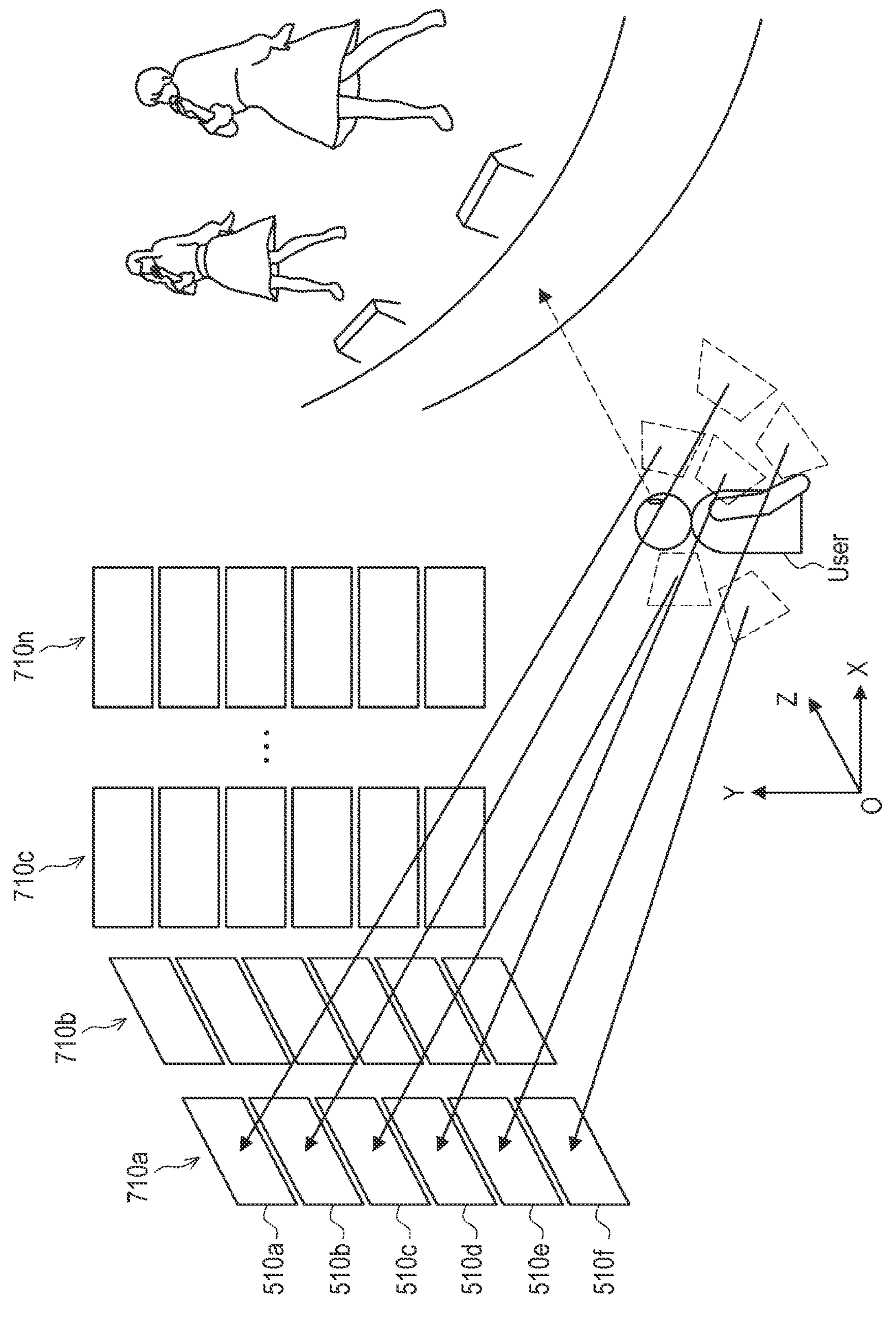
FIG. 17 is a diagram illustrating an example of an automatic rearrangement (alignment arrangement) according to the present embodiment.

FIG. 17 is a diagram for describing an example of automatic rearrangement (alignment arrangement) according to the present embodiment. As illustrated in FIG. 17, the arrangement control unit 303 arranges (aligns) a plurality of captured images manually arranged around the user vertically, for example, at a position away to some extent on the left side of the user with respect to the stage direction, and creates an alignment shelf 710*a*. The alignment shelf 710*a* is formed by vertically aligning the captured images 510*a* to 510*f* manually arranged around the user.

A plurality of the alignment shelves 710 may be created. For example, the arrangement control unit 303 may newly generate the alignment shelf 710 every time automatic rearrangement (alignment arrangement) is performed. In the example illustrated in FIG. 17, n alignment shelves 710 are created. Furthermore, the alignment shelf 710 may be prepared for every sorting group. The sorting group is, for example, a group based on the tag described above. For example, the arrangement control unit 303 may store the captured image in each alignment shelf 710 (an alignment shelf of a subject A, an alignment shelf of a subject B, and the like) for every subject appearing in the captured image.

Furthermore, the area (size) of the alignment shelf 710 may be set in advance, and the arrangement control unit 303 may reduce and align (store) each captured image in a case where the captured images cannot fit all the alignment shelves. Alternatively, in a case where the captured images cannot be all of the alignment shelves, the arrangement control unit 303 may newly generate the next alignment shelf and align (store) the captured images.

Furthermore, an arrangement place of the alignment shelf is not particularly limited, but for example, it is preferable that the alignment shelf 710 does not cover the stage and is arranged at a distance that can ensure the visibility of each captured image although being slightly away from the user. The user can also take out any captured image from the alignment shelf 710 and manually arrange the captured image. In a case where the alignment shelf 710 is arranged at a distance that the user cannot reach, the user can perform an operation such as taking out an arbitrary captured image from the alignment shelf 710 or moving the alignment shelf 710 by using an operation item such as a laser pointer in the virtual space.

Furthermore, when automatically aligning one or more captured images manually arranged on the alignment shelf, the arrangement control unit 303 may display a trajectory (movement animation) in which each captured image moves to the alignment shelf. A speed performance such as an easy curve or a performance such as a curve design of the trajectory may be given to the trajectory.

Furthermore, the arrangement control unit 303 can also store the position and posture of each captured image at the time of manual arrangement, and return the plurality of captured images aligned on the alignment shelf to the manual arrangement state again.

Operation processing related to each rearrangement of the captured images described above will be described below with reference to FIG. 18.

Figure 18:
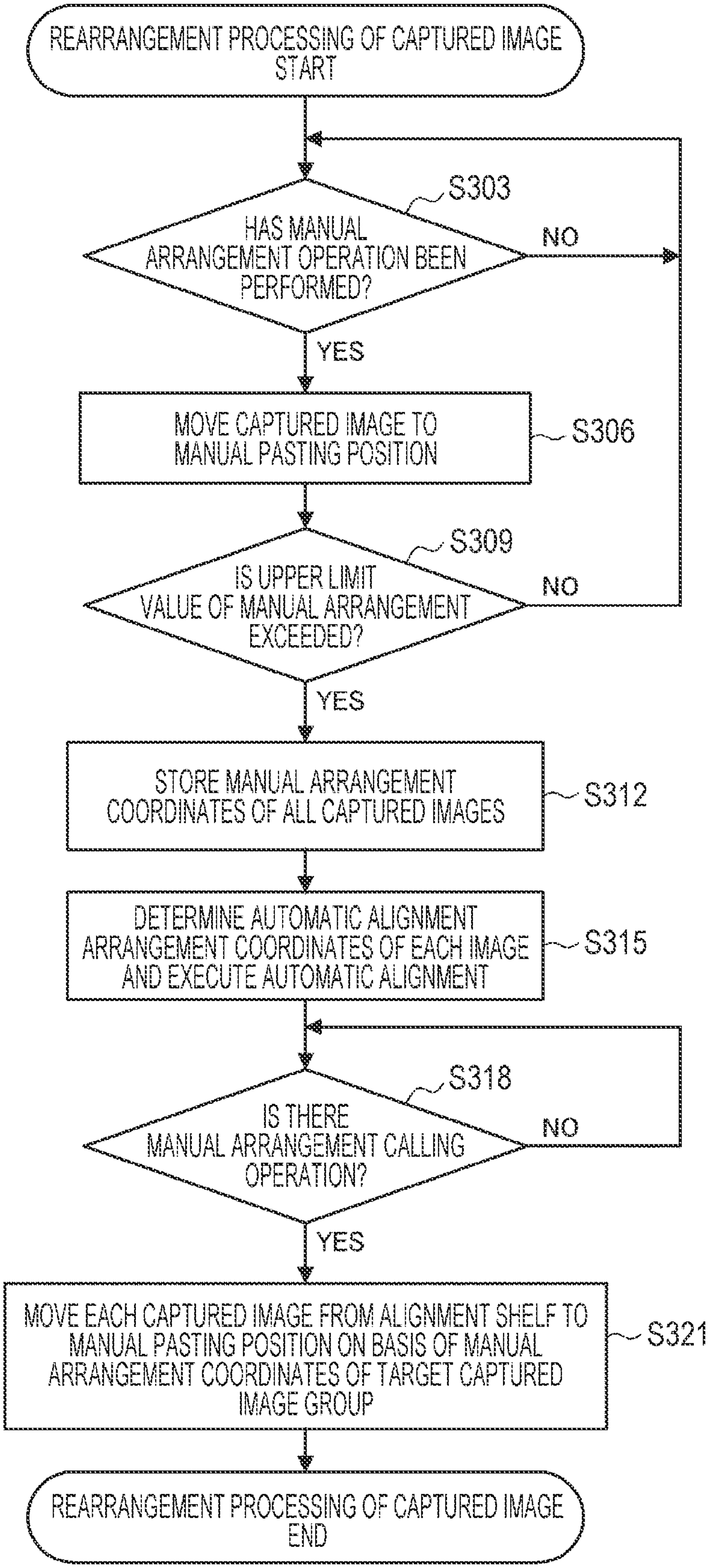
FIG. 18 is a flowchart illustrating an example of a flow of processing of rearranging a captured image according to the present embodiment.

FIG. 18 is a flowchart illustrating an example of a flow of rearrangement processing of a captured image according to the present embodiment. As illustrated in FIG. 18, first, in a case where the manual arrangement operation has been performed by the user (step S303/YES), the arrangement control unit 303 moves the selected captured image to a manual pasting position designated by the user (step S306). The user performs an operation of holding (selecting) the captured image 510 (See FIG. 3.) arranged at a predetermined position immediately after image capturing using the controller 20, for example, and moves a hand holding the controller 20 in the real world so as to move the captured image 510 to an arbitrary position in a state of holding the captured image 510 in the virtual space. The arrangement control unit 303 controls the position and posture of the captured image 510 in accordance with a user operation (sensing data such as button operation and acceleration) detected by the controller 20.

The processing illustrated in steps S303 to S306 described above can be repeated until an upper limit value of the manual arrangement is exceeded (step S309). That is, the user can perform an operation of sequentially pasting (moving) a plurality of the captured images to arbitrary positions.

Next, in a case where the upper limit value of the manual arrangement has been exceeded (step S309/YES), the arrangement control unit 303 stores the manual arrangement coordinates of all the captured images manually arranged in the storage unit 320 (step S312). An image ID is assigned to each captured image, and the arrangement control unit 303 stores manual arrangement coordinates in association with the image ID. Furthermore, the upper limit value of the manual arrangement may be the upper limit number of sheets or an upper limit occupancy rate (a ratio of the manually arranged captured image to a peripheral region of the user, and the like). Furthermore, the manual arrangement coordinates include not only the three-dimensional position in the virtual space but also the arrangement posture (tilt, angle) of each captured image. Furthermore, the arrangement control unit 303 may also store a state of enlargement and reduction of each captured image. In this manner, the arrangement control unit 303 can store the manual arrangement state of the plurality of captured images in association with the image ID. Note that the arrangement control unit 303 may store an image ID group including the image IDs of the respective captured images by assigning a storage date and time (date and time of manual arrangement) or a call number.

Next, the arrangement control unit 303 determines automatic alignment arrangement coordinates of each image and executes automatic alignment (step S315). The automatic alignment coordinate of each image is information indicating an alignment destination of the image. Specifically, for example, the address corresponds to the address of the alignment shelf. The arrangement control unit 303 assigns an address of an alignment shelf to each captured image. For example, the arrangement control unit 303 sequentially assigns addresses starting from the head address of the alignment shelf A (the uppermost arrangement place in the case of the aligned shelves arranged vertically), and similarly sequentially assigns addresses starting from the head address of the next alignment shelf B when all addresses are filled. Note that, in a case where a plurality of alignment shelves is prepared for every sorting group, the arrangement control unit 303 assigns vacant addresses of the corresponding alignment shelves on the basis of the tag of each captured image. The arrangement control unit 303 moves each captured image to the assigned address (execution of automatic alignment). Furthermore, each automatic alignment arrangement coordinate is stored in association with the image ID.

The automatic alignment of the manually arranged captured images to the alignment shelf has been described above. The captured image thus automatically aligned can be returned to the manual arrangement position at any time on the basis of the stored information described above.

Specifically, when there is the manual arrangement calling operation by the user (step S318/YES), the arrangement control unit 303 performs control to move each captured image from the alignment shelf to the manual pasting position on the basis of the manual arrangement coordinates of the target captured image group (step S321). The call of the manual arrangement can be performed by specifying the call number described above or the date and time of the manual arrangement. The user may designate the number from, for example, a call number list display and the like of manual arrangement.

The processing of rearranging captured images according to the present embodiment has been described above. Note that the operation processing illustrated in FIG. 18 is an example, and the present disclosure is not limited to the example illustrated in FIG. 18.

Furthermore, all the processing illustrated in FIG. 18 may not necessarily be performed by a single device. For example, in the above description, it has been assumed that all the processing illustrated in FIG. 18 is performed by the information processing apparatus 30, but the present disclosure is not limited thereto. For example, all the processing illustrated in FIG. 18 may be performed by the display device 10, or may be performed by the display device 10 and the information processing apparatus 30.

3-6. Sharing Processing of Captured Image

Furthermore, in the present embodiment, the captured image can be shared with the outside. For example, by selecting an arbitrary captured image and performing a predetermined sharing operation, the user can share the captured image (transmit a copy of the captured image) to other users viewing the VR content together. A sharing destination can be arbitrarily selected by the user. As an example, the sharing destination may be another user who is viewing the VR content together, or may be another user who is registered as a friend. In a case where the VR content is real-time distribution and the like, it is also assumed that the VR content is viewed together with a friend. In this case, an avatar of the friend is arranged in the virtual space, and the user can have a conversation (voice or chat) with the friend, share the captured image, and the like.

Figure 19:
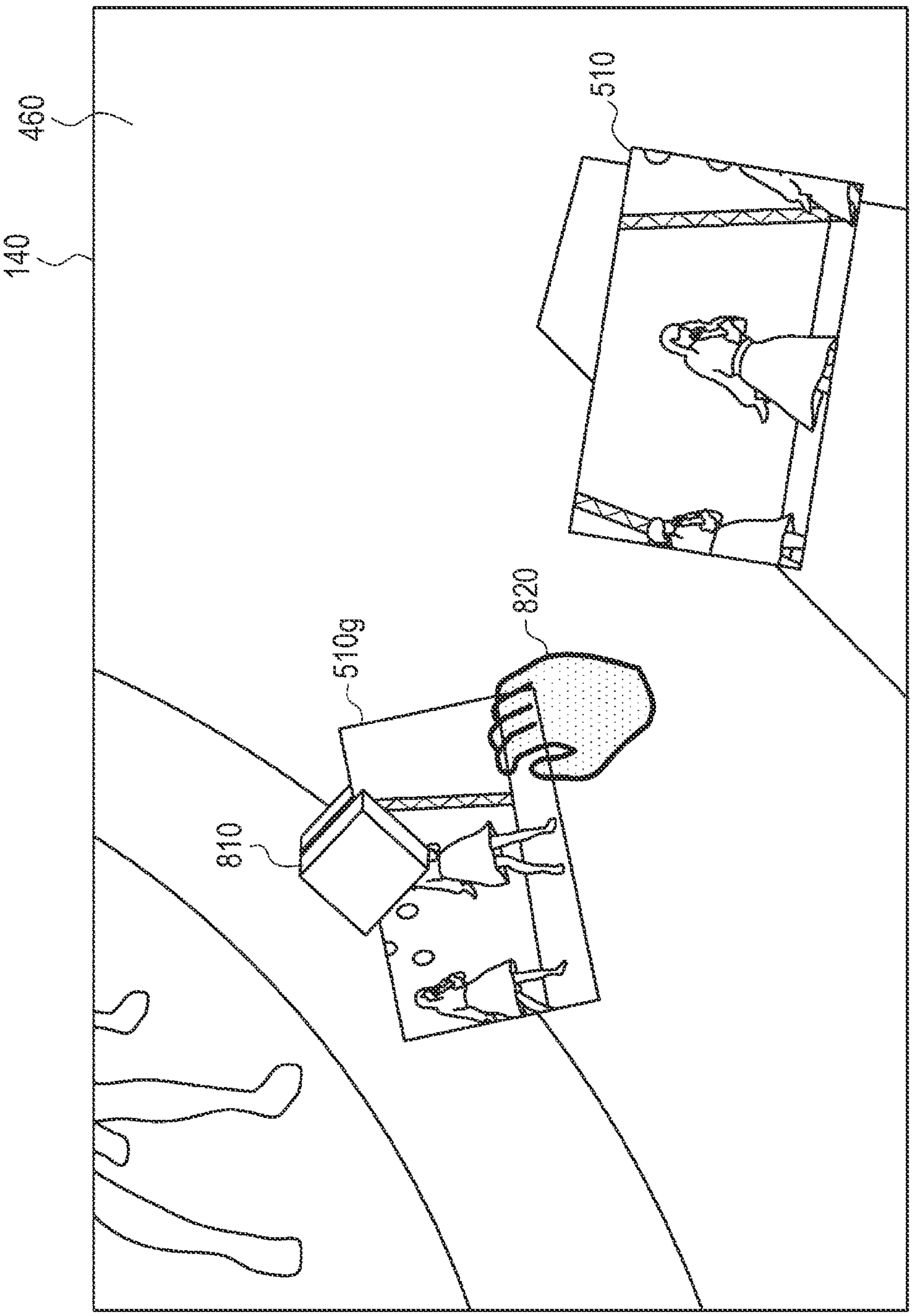
FIG. 19 is a diagram illustrating an example of a sharing operation according to the present embodiment.

For example, as illustrated in FIG. 19, a sharing operation may be an operation of holding a captured image 510*g* to be shared with a virtual hand 820 and sliding, touching, inserting the captured image into a cut provided in a predetermined shared object 810 (virtual object), or the like. In a case where such an operation is performed, the sharing control unit 305 may display a screen for selecting a share destination and cause the user to select the share destination. Alternatively, the sharing control unit 305 may automatically determine friends who participate together (other users registered as friends who are simultaneously viewing the same VR content) as sharing destinations. The sharing control unit 305 arranges and presents the shared captured image at a predetermined position in the virtual space of a sharing destination user. Notification of the presentation of the shared captured image may be provided to the sharing destination user by sound or display. Note that the friend participating together is not limited to a friend similarly viewing the same VR content on the HMD, and may be a friend viewing the same VR content on a smartphone, a tablet terminal, and the like.

Furthermore, the captured image may be shared with the outside with a system (another server (not illustrated)) that provides various services using the captured image to the user. For example, there is a service of creating soft or hard goods using a captured image, such as creating an album from the captured image or creating a mug, a T-shirt, paper, and the like on which the captured image is printed. Use of such a service may be charged.

Furthermore, the "outside" in sharing of a captured image with the outside means the outside of the display device 10, and all devices other than the display device 10 can be targets. Therefore, in the present system, for example, the captured image can be shared (transferred) to a smartphone, a tablet terminal, and the like of the user. Furthermore, as sharing from the outside, it is also possible to acquire an image from a smartphone or a tablet terminal of the user or a cloud used by the user (to arrange the image in the virtual space).

It is possible to provide a next-generation experience in which experience in the virtual space extends to experience in the real world, such as an experience of sharing (transferring) an image captured by oneself to the outside in the virtual space, and create new value of the VR experience.

The sharing processing of the captured image described above will be described below with reference to FIG. 20.

Figure 20:
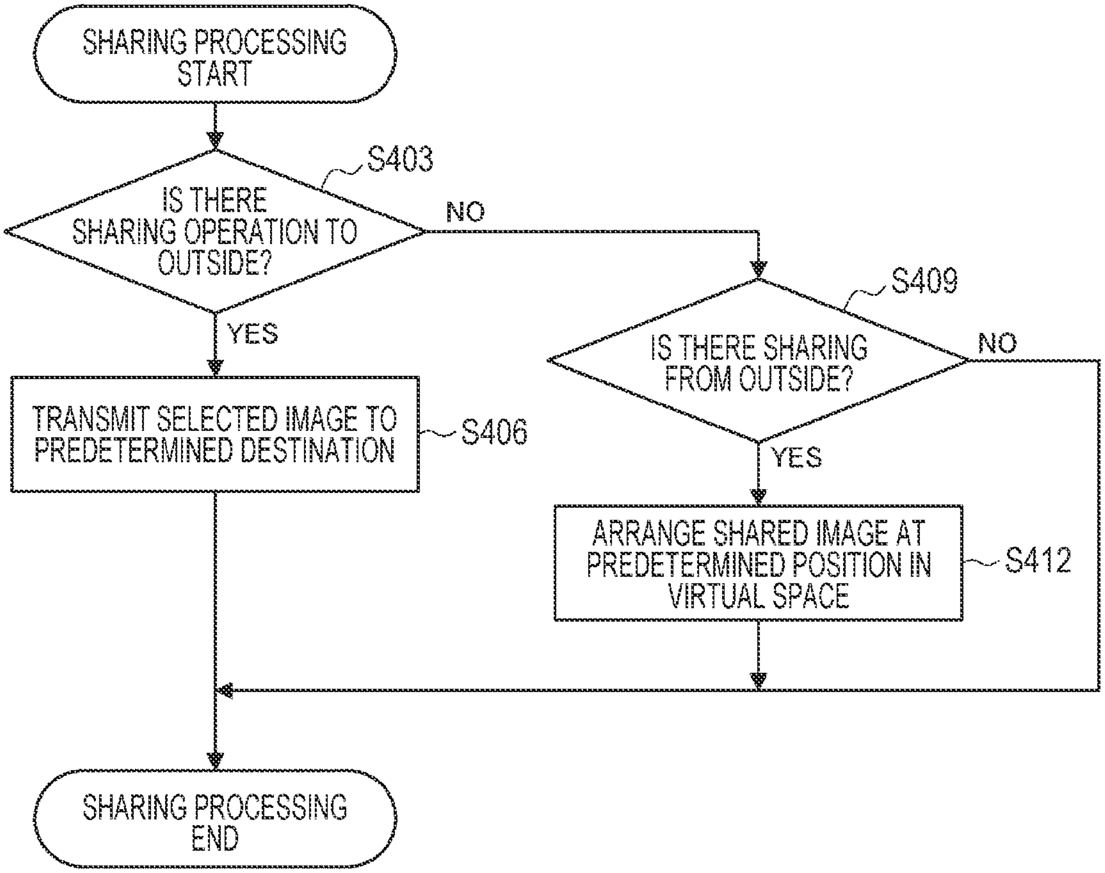
FIG. 20 is a flowchart illustrating an example of a flow of sharing processing of a captured image according to the present embodiment.

FIG. 20 is a flowchart illustrating an example of a flow of the sharing processing of a captured image according to the present embodiment. As illustrated in FIG. 20, first, in a case where there is a sharing operation to the outside (step S403), the sharing control unit 305 transmits the captured image selected in the sharing operation by the user to a predetermined sharing destination (step S406). More specifically, by arranging the captured image to be shared in the virtual space of the sharing destination user by the content viewing control unit 301, the captured image can be substantially transmitted to a display device of the sharing destination user. Alternatively, the sharing control unit 305 transmits the captured image to the display device of the sharing destination user, and the display device of the sharing destination user performs control to arrange the captured image in the virtual space. Furthermore, the sharing destination may be a server of a system that provides various services using the captured image. Furthermore, the predetermined sharing destination may be a sharing destination arbitrarily selected by the user, or may be a preset sharing destination. Furthermore, a plurality of the shared objects 810 (virtual objects) used for the sharing operation may be prepared, and a sharing destination associated in advance with the used shared objects 810 may be set as a predetermined sharing destination.

On the other hand, in a case where the captured image is shared from the outside (step S409/YES), the sharing control unit 305 arranges the shared captured image at a predetermined position in the virtual space of the user (step S412). The display device 10 may notify the user of the presentation of the captured image by sound or display. Furthermore, the predetermined arrangement position of the shared captured image may be, for example, outside the user's field of view in the virtual space. That is, for example, a captured image captured by the user may be arranged on the right outside the user's field of view, and a shared captured image may be arranged on the left outside the field of view. Furthermore, the sharing control unit 305 may clearly indicate from whom (from where) the captured image is shared by icons and the like.

The sharing processing of the captured image according to the present embodiment has been described above. Note that the operation process illustrated in FIG. 20 is an example, and the present disclosure is not limited to the example illustrated in FIG. 20.

Furthermore, all the processing illustrated in FIG. 20 may not necessarily be performed by a single device. For example, in the above description, it has been assumed that all the processing illustrated in FIG. 20 is performed by the information processing apparatus 30, but the present disclosure is not limited thereto. For example, all the processing illustrated in FIG. 20 may be performed by the display device 10, or may be performed by the display device 10 and the information processing apparatus 30.

4. Others

The information processing system according to the present embodiment will be supplemented below.

Imaging is not limited to acquisition of a still image, and may be acquisition of a moving image. Specifically, for example, the imaging processing unit 302 can acquire a photograph with more realistic feeling such as a photograph that moves for a moment such as several seconds. The moving time (such as the number of seconds) may be preset by the user. Furthermore, such a moving picture (moving image) may further include sound.

Furthermore, also when a moving image is acquired in imaging in the virtual space, the determination of image capturing success or failure described with reference to FIGS. 7 and 8 may be performed for every frame. The imaging processing unit 302 may perform processing of cutting or darkening the frame for which failure determination such as eye closure or dress turnover has been made. Which frame is regarded as the failure determination may be set in advance on the content distributor side.

Furthermore, the information processing apparatus 30 may set an upper limit on the face size of the subject when imaging the subject. That is, by limiting the zoom-in processing, it is possible to prohibit image capturing of a picture that is too close to the face of the subject. Such a setting may be appropriately set by the content distributor side.

Furthermore, the content viewing control unit 301 may perform control such that the captured image pasted to the space as illustrated in FIG. 16 flutters (moves) in conjunction with the movement of the distributor (for example, a main viewing target of the content, such as a performer or a game character on a stage) of the content in the virtual space. Furthermore, the content viewing control unit 301 may acquire bone information and the like of the performer and the like, and may give a behavior such as vibrating the captured image when the performer and the captured image pasted to the space collide with each other (for example, when the performer on the stage extends his/her hand toward the user side and approaches the user side, or the like). In this manner, by moving the captured image pasted to the space according to the movement of the performer or the like, it is possible to give the user a realistic feeling of the virtual space.

Furthermore, the arrangement control unit 303 may have a function of recognizing the position of the performer and the like in the virtual space and supporting arrangement such that the captured image is arranged not to overlap with the performer and the like.

Furthermore, the images to be arranged in the virtual space may be laid out and arranged at any position in the virtual space by calling various images already stored in the storage unit 320 or another terminal in addition to the captured image acquired by image capturing in the virtual space.

Furthermore, the captured image to be acquired is not limited to a 2D image (2D texture), and may be a 3D image (3D still image or moving image).

Furthermore, the content viewing control unit 301 may display an avatar of another user who is simultaneously viewing the same content in the virtual space. Furthermore, the content viewing control unit 301 may present information indicating the position of the avatar of the friend of the user (another user registered as a friend) to the user. Furthermore, the information processing apparatus 306 can also specify a place in the virtual space where the captured image is captured from the captured image shared by the user, and present the specified image capturing place to the user.

Furthermore, the embodiment described above has been described assuming VR content as an example, but the present disclosure can also be applied to augmented reality (AR) or mixed reality (MR). For example, in the case of AR, the information processing apparatus 30 acquires a part of a display range including a subject (an image displayed as information of a virtual world fused with a real world, such as a virtual object.) in a virtual space displayed in a superimposed manner in the real world (real space) as an image (in this specification, it is regarded as "imaging"), and arranges the captured image as a photographic object in the virtual space displayed in a superimposed manner in the real space. Furthermore, the display device 10 may be a transmissive HMD, a smartphone, a tablet terminal, and the like.

Furthermore, the information processing apparatus 30 may set each of the above-described various functions (acquisition of captured image, manual arrangement of captured image, alignment arrangement of captured image, sharing machine of captured image, and the like) as a billing target function.

Furthermore, in the above-described embodiment, it has been described that the captured images manually arranged are automatically aligned on the alignment shelf, but the present disclosure is not limited thereto. For example, the arrangement control unit 303 may perform control to automatically align the captured images arranged after imaging on the alignment shelf as illustrated in FIG. 3. Such automatic alignment control may be performed with a user operation as a trigger, or may be performed when the number of arranged captured images reaches the upper limit number of sheets.

5. Summary

As described above, in the information processing system according to the embodiment of the present disclosure, it is possible to further enhance the entertainment of the image capturing experience in the virtual space.

The preferred embodiments of the present disclosure have been described in detail above with reference to the accompanying drawings, but the present technology is not limited to such examples. It is obvious that a person having ordinary knowledge in the technical field of the present disclosure can conceive various change examples or modification examples within the scope of the technical idea described in the claims, and it is naturally understood that these also belong to the technical scope of the present disclosure.

For example, it is also possible to create a computer program for causing hardware such as the CPU, the ROM, and the RAM built in the display device 10, the controller 20, or the information processing apparatus 30 described above to exhibit the functions of the display device 10, the controller 20, or the information processing apparatus 30. Furthermore, a computer-readable storage medium storing the computer program is also provided.

Furthermore, the effects described in the present specification are merely illustrative or exemplary, and are not restrictive. That is, the technology according to the present disclosure can exhibit other effects obvious to those skilled in the art from the description of the present specification together with or instead of the effects described above.

Note that the present technology can also have the following configurations.

(1)

An information processing apparatus including a control unit that, when an imaging trigger for imaging a subject in a virtual space is detected, generates a captured image obtained by imaging the subject, and performs control to arrange the generated captured image in the virtual space as a virtual object.

(2)

The information processing apparatus according to (1) described above, in which the control unit arranges the captured image in the virtual space according to a preset arrangement rule.

(3)

The information processing apparatus according to (2) described above, in which the control unit arranges the virtual space at a place set in advance with respect to a position of a user viewing the virtual space.

(4)

The information processing apparatus according to (3) described above, in which the control unit performs control to arrange outside a field of view of the user.

(5)

The information processing apparatus according to (3) or (4) described above, in which the control unit performs control to arrange in a place that avoids a position overlapping with a predetermined viewing target in the virtual space.

(6)

The information processing apparatus according to any one of (1) to (5) described above, in which the control unit images a part of a field of view of a user viewing the virtual space.

(7)

The information processing apparatus according to (6) described above, in which a field of view of the user viewing the virtual space includes a display range of a display unit in which the virtual space is displayed, and the control unit acquires a part of the display range of the display unit as a captured image.

(8)

The information processing apparatus according to any one of (1) to (7) described above, in which when the imaging trigger is detected, the control unit continuously acquires a plurality of the captured images and determines whether or not each of the captured images has been successfully captured.

(9)

The information processing apparatus according to (8) described above, in which among the continuously acquired captured images, the control unit arranges a captured image determined to be successfully captured in the virtual space as the virtual object.

(10)

The information processing apparatus according to any one of (1) to (9) described above, in which the control unit performs notification to notify a user that the captured image has been arranged.

(11)

The information processing apparatus according to any one of (1) to (10) described above, in which the control unit adds accompanying information regarding the captured image to the captured image.

(12)

The information processing apparatus according to (11) described above, in which the accompanying information includes at least information regarding the subject appearing in the captured image or information regarding a time when the imaging has been performed on a reproduction time axis of content provided in the virtual space.

(13)

The information processing apparatus according to any one of (1) to (12) described above, in which the control unit acquires a captured image excluding at least an additional virtual object overlapping with the subject.

(14)

The information processing apparatus according to any one of (1) to (13) described above, in which the control unit rearranges the arranged captured image at an arbitrary position and posture in the virtual space according to a user operation.

(15)

The information processing apparatus according to any one of (1) to (14) described above, in which the control unit moves and aligns a plurality of the captured images arranged at predetermined positions to other places in the virtual space.

(16)

The information processing apparatus according to (15) described above, in which the control unit stores an arrangement state of the plurality of captured images before being aligned, and performs control to return the plurality of captured images moved to the other places and aligned to a state before the alignment.

(17)

The information processing apparatus according to any one of (1) to (16) described above, in which the control unit performs control to share the captured image arranged in the virtual space to an outside.

(18)

The information processing apparatus according to any one of (1) to (17) described above, in which the control unit performs display indicating a range of the imaging on a display unit in which the virtual space is displayed.

(19)

An information processing method including, when a processor detects an imaging trigger for imaging a subject in a virtual space, generating, by a processor, a captured image obtained by imaging the subject, and performing control to arrange the generated captured image in the virtual space as a virtual object.

(20)

An information processing system including:

a display device;

a controller; and an information processing apparatus including a control unit that, when an imaging trigger for imaging a subject in a virtual space displayed on the display device is detected by the controller, generates a captured image obtained by imaging the subject, and performs control to arrange the generated captured image in the virtual space as a virtual object.

REFERENCE SIGNS LIST

10 Display device
140 Display unit
20 Controller
30 Information processing apparatus
300 Control unit

301 Content viewing control unit
302 Imaging processing unit
303 Arrangement control unit
304 Tagging unit
305 Sharing control unit

The invention claimed is:

1. An information processing apparatus comprising:
circuitry configured to:
control to capture an image or a moving image of a subject in a field of view of a user in a virtual space; and
control to display, at a predetermined area in a display, the captured image or the captured moving image in the virtual space,
wherein the captured image or the captured moving image is based on less than an entirety of the field of view of the user viewing the virtual space,
wherein the predetermined area is less than an entirety of an area of the display and the predetermined area is at a position defined by a predetermined relative positional relationship with respect to a position of the user in the virtual space, and
wherein the circuitry is further configured to maintain the captured image or the captured moving image being displayed at the predetermined area in the display in response to the field of view of the user changing.

2. The information processing apparatus according to claim 1, wherein the circuitry is further configured to arrange the displayed image or the displayed moving image in the virtual space according to a preset arrangement rule.

3. The information processing apparatus according to claim 2, wherein the circuitry is further configured to arrange the displayed image or the captured moving image at a place in the virtual space set in advance with respect to a position of the user viewing the virtual space.

4. The information processing apparatus according to claim 3, wherein the circuitry is further configured to perform control to arrange the displayed image or the displayed moving image in the virtual space outside the field of view of the user.

5. The information processing apparatus according to claim 3, wherein the circuitry is further configured to perform control to arrange the displayed image or the displayed moving image in a place in the virtual space that avoids a position overlapping with a predetermined viewing target in the virtual space.

6. The information processing apparatus according to claim 1, wherein the circuitry is further configured to image a part of the field of view of the user viewing the virtual space.

7. The information processing apparatus according to claim 6, wherein
the field of view of the user viewing the virtual space includes a display range of a display in which the virtual space is displayed, and
the circuitry is further configured to acquire a part of the display range of the display as the imaged subject.

8. The information processing apparatus according to claim 1, wherein when a trigger is detected, the circuitry is further configured to continuously acquire a plurality of the images or the moving images and determine whether or not each of the acquired images or the acquired moving images has been successfully captured.

9. The information processing apparatus according to claim 8, wherein among the continuously acquired images or moving images, the circuitry is further configured to arrange an image or a moving image determined to be successfully captured in the virtual space as a two-dimensional virtual image.

10. The information processing apparatus according to claim 1, wherein the circuitry is further configured to perform notification to notify the user that the captured image or the captured moving image has been arranged.

11. The information processing apparatus according to claim 1, wherein the circuitry is further configured to add accompanying information regarding the captured image or the captured moving image to the displayed image or the displayed moving image.

12. The information processing apparatus according to claim 11, wherein the accompanying information includes at least information regarding the subject appearing in the captured image or the captured moving image or information regarding a time when the imaging has been performed on a reproduction time axis of content provided in the virtual space.

13. The information processing apparatus according to claim 1, wherein the circuitry is further configured to acquire an image or moving image excluding at least an additional virtual object overlapping with the subject.

14. The information processing apparatus according to claim 1, wherein the circuitry is further configured to rearrange the displayed image or moving image at an arbitrary position and posture in the virtual space according to a user operation of the user.

15. The information processing apparatus according to claim 1, wherein the circuitry is further configured to move and align a plurality of the displayed images or moving images arranged at predetermined positions to other places in the virtual space.

16. The information processing apparatus according to claim 15, wherein the circuitry is further configured to store an arrangement state of the plurality of displayed images or moving images before being aligned, and perform control to return the plurality of displayed images or moving images moved to the other places and aligned to a state before the alignment.

17. The information processing apparatus according to claim 1, wherein the circuitry is further configured to perform control to share the displayed image or the displayed moving image arranged in the virtual space to an outside.

18. The information processing apparatus according to claim 1, wherein the circuitry is further configured to perform display indicating a range of the imaging on a display in which the virtual space is displayed.

19. The information processing apparatus according to claim 1, wherein an arrangement of the subject in the virtual space at a time after the capturing of the image or moving image is different than the arrangement of the subject in the virtual space in the field of view of the user at a time of the capturing of the image or moving image.

20. The information processing apparatus according to claim 1, wherein a position of the subject in the virtual space at a time after the capturing of the image or moving image is different than the position of the subject in the virtual space in the field of view of the user at a time of the capturing of the image or moving image.

21. The information processing apparatus according to claim 1, wherein the captured image or moving image is displayed in a different view than the subject in the virtual space.

22. The information processing apparatus according to claim 1, wherein the circuitry is further configured to move the captured image or the captured moving image to follow the movement of the user in response to the user moving in the virtual space.

23. An information processing method comprising:

controlling to capture an image or a moving image of a subject in a field of view of a user in a virtual space; and controlling to display, at a predetermined area in a display, the captured image or the captured moving image in the virtual space, wherein the captured image or the captured moving image is based on less than an entirety of the field of view of the user viewing the virtual space, wherein the predetermined area is less than an entirety of an area of the display and the predetermined area is at a position defined by a predetermined relative positional relationship with respect to a position of the user in the virtual space, wherein the displaying of the captured image or the captured moving image includes maintaining displaying of the captured image or the captured moving image at the predetermined area in the display in response to the field of view of the user changing.

24. An information processing system comprising:

a display device;

a controller; and an information processing apparatus including circuitry configured to:

control to capture an image or a moving image of a subject in a field of view of a user in a virtual space; and control to display, at a predetermined area in a display, the captured image or the captured moving image in the virtual space, wherein the captured image or the captured moving image is based on less than an entirety of the field of view of the user viewing the virtual space, wherein the predetermined area is less than an entirety of an area of the display and the predetermined area is at a position defined by a predetermined relative positional relationship with respect to a position of the user in the virtual space, and wherein the displaying of the captured image or the captured moving image includes maintaining displaying of the captured image or the captured moving image at the predetermined area in the display in response to the field of view of the user changing.

* * * * *